(12) United States Patent
Brabeck et al.

(10) Patent No.: US 7,448,668 B2
(45) Date of Patent: Nov. 11, 2008

(54) SECURITY SCREEN DOOR FOR VEHICLES AND A LOCKING SYSTEM THEREFOR

(75) Inventors: Steven John Brabeck, Ormeau (AU); Peter Bouma, Ormeau (AU); John Russell Watts, South Melbourne (AU); David Greenbury, South Melbourne (AU)

(73) Assignee: Crimsape Security Systems Pty Ltd, Ormeau, Queensland (AU)

(*) Notice: Subject to any disclaimer, the term of this patent is extended or adjusted under 35 U.S.C. 154(b) by 328 days.

(21) Appl. No.: 10/540,175

(22) PCT Filed: Dec. 22, 2003

(86) PCT No.: PCT/AU03/01708

§ 371 (c)(1),
(2), (4) Date: Jun. 17, 2005

(87) PCT Pub. No.: WO2004/057146

PCT Pub. Date: Jul. 8, 2004

(65) Prior Publication Data

US 2006/0202506 A1    Sep. 14, 2006

(30) Foreign Application Priority Data

Dec. 20, 2002  (AU)  ............................... 2002953485
May 16, 2003  (AU)  ............................... 2003902378
Oct. 15, 2003  (AU)  ............................... 2003905657

(51) Int. Cl.
B60J 5/00  (2006.01)

(52) U.S. Cl. .................. 296/146.1; 296/146.9; 160/92; 160/180; 160/96; 49/394

(58) Field of Classification Search ................. 296/156, 296/146.9, 146.1; 49/67, 68, 56, 364, 370, 49/394, 395, 503, 506, 163, 62, 65; 160/92, 160/95, 103, 180, 96; 292/259 A, DIG. 3, 292/DIG. 23
See application file for complete search history.

(56) References Cited

U.S. PATENT DOCUMENTS

| 4,094,099 | A | * | 6/1978 | Birch | ........................ 49/163 |
| 5,180,201 | A | * | 1/1993 | Hauber | .................. 292/336.3 |
| 5,474,345 | A | * | 12/1995 | Clark et al. | ................. 292/302 |
| 5,802,765 | A | * | 9/1998 | Vickery | ......................... 49/67 |
| 6,009,932 | A | * | 1/2000 | Smith | ........................ 160/371 |
| 6,125,910 | A | * | 10/2000 | Pepperell et al. | ........... 160/371 |

(Continued)

FOREIGN PATENT DOCUMENTS

AU    200014921 A * 8/2000

(Continued)

*Primary Examiner*—Jason S Morrow
(74) *Attorney, Agent, or Firm*—Wood, Herron & Evans LLP

(57) ABSTRACT

A security screen door (1) for vehicles comprises a frame (2) forming an opening, at least one sliding section (10, 12) within the frame and a quick action lever (21) on an inside of the door for locking and unlocking the door via a first lock (20). The sliding section comprises a second lock (14) for securing the sliding section in a closed position, the second lock being unlocked from an outside using a key to allow the sliding section to be moved from a closed position to an open position to allow access from the outside to the quick action lever.

25 Claims, 22 Drawing Sheets

U.S. PATENT DOCUMENTS

| | | | |
|---|---|---|---|
| 2003/0070768 A1* | 4/2003 | Lewis et al. | 160/92 |
| 2005/0257899 A1* | 11/2005 | Lee et al. | 160/98 |
| 2006/0202506 A1* | 9/2006 | Brabeck et al. | 296/146.1 |

FOREIGN PATENT DOCUMENTS

| | | | |
|---|---|---|---|
| DE | 29619959 U1 * | 1/1997 | |
| DE | 20119881 U1 * | 3/2002 | |
| JP | 2001073651 A | 3/2001 | |
| JP | 2002047874 A | 2/2002 | |

* cited by examiner

SECURITY SCREEN DOOR FOR VEHICLES AND A LOCKING SYSTEM THEREFOR

CROSS-REFERENCE TO RELATED APPLICATIONS

This is a national stage application filed under 35 U.S.C 371 based on International Application No. PCT/AU2003/001708 filed Dec. 22, 2003, and claims priority under 35 U.S.C. 119 of Australian Patent Application No. 2003905657 filed Oct. 15, 2003. Australian Patent Application No. 2003902378 filed May 16, 2003 and Australian Patent Application No. 2002953485 filed Dec. 20, 2002.

FIELD OF THE INVENTION

The invention relates to an improved security screen door for vehicles and a locking system therefor. In particular, although not exclusively, the invention relates to an improved screen door for mobile homes, caravans, campervans and the like that provides for greater levels of security against intrusion without compromising the safety of the occupants in the event of fire or similar life threatening incidents.

BACKGROUND TO THE INVENTION

Holidaymakers are increasingly utilizing mobile homes, caravans, campervans and similar recreational vehicles as a means for taking travelling holidays. This form of holiday is especially popular with retirees and older couples as it provides for a flexible and cost efficient way of taking a holiday.

Mobile homes and the like generally comprise a front cab section for driving the vehicle and a rear accommodation compartment comprising living, eating and sleeping areas. The rear compartment is accessed from outside the vehicle through a solid and secure outer door, usually on the side or back of the vehicle, and a less secure inner door in the form of a screen.

When the mobile home is, for example, at a camping location, the solid outer door is often left open and the screen is kept closed. This facilitates ventilation of the vehicle, allows the ingress of light, offers a view through the doorway if the mobile home is parked in a scenic location and prevents the ingress of insects. Screens known in the art are either lockable or non-lockable and may be unlocked from the inside or from the outside by means of a key.

In the case of the non-lockable screen, no security is provided for valuables and/or people within the mobile home by the screen door alone. Hence, it is not possible to leave the outer door open and only the screen closed while the occupants are away from the mobile home or asleep at night without the contents of the vehicle being susceptible to theft or the safety of the occupants being threatened by intruders.

Known lockable screens for campervans and mobile homes offer only limited levels of security against intruders because the mesh of conventional screens is easily cut. Furthermore, the screen door can be kicked away from the supporting frame relatively easily and hence offers little security against a determined intruder.

Lockable screens known in the art for mobile homes and the like can also represent a danger to the occupants of the vehicle in the event of an emergency such as a fire. For example, consider a fire that has broken out within the mobile home and the occupants have left the security screen locked. If the occupants have not left the key in the inner lock there is a real danger that they may become trapped within the campervan and perish.

Also, in dangerous situations, people often tend to act in an irrational manner and the process of having to unlock the screen from the inside may be too complicated for someone who is hysterical and frightened. This is especially the case for older people and therefore this problem is particularly relevant to the mobile home and campervan industry.

OBJECT OF THE INVENTION

It is an object of the present invention to provide an improved security screen door that overcomes at least some of the identified problems in the prior art or provides the consumer with a viable commercial alternative.

It is a further object of the present invention to provide an improved security screen door for mobile homes and the like.

Further objects will be evident from the following description.

DISCLOSURE OF THE INVENTION

In one form, although it need not be the only or indeed the broadest form, the invention resides in a security screen door for vehicles, said screen door comprising:

a frame forming an opening;

at least one sliding section within said frame;

a quick action lever on an inside of said security screen door for locking and unlocking said security screen door via a first lock; and said sliding section comprising a second lock for securing said sliding section in a closed position;

wherein said second lock is unlocked from an outside using a key to allow said sliding section to be moved from a closed position to an open position to allow access from the outside to said quick action lever.

Preferably, the first lock comprises a triple lock.

Suitably, the second lock is one of the following: a free rotation single cylinder lock, a free rotation double cylinder lock, a clutched cam cylinder lock.

Preferably, the quick action lever is pivotally mounted to a frame member of said door, said lever comprising a drive arm for locking and unlocking said first lock.

Preferably, the first lock comprises a first drive recess coupled to an elongated primary engaging member, said drive arm moving against lower and upper angled exit shoulders of said drive recess to respectively engage said primary member with, and disengage said primary member from, catch plates mounted on said vehicle.

Preferably, the quick action lever further comprises at least one stop to limit movement of said lever.

Preferably, the sliding section comprises a locking pin, said locking pin engaging a slot in said quick action lever when said quick action lever is in a locked position.

Suitably, the second lock comprises an elongated secondary engaging member which engages with an aperture in a frame member of said door to lock said sliding section.

Preferably, the security screen door further comprises woven wire intruder resistant mesh covering at least part of said opening formed by said frame.

Suitably, each said sliding section is a sash screen, wherein at least one of said sash screens is slidable within a pair of slider frame members.

Suitably, each said sliding section comprises:

a plurality of frame members, each frame member having a channel section and a clamping portion spaced from said channel section;

woven wire intruder resistant mesh covering an opening enclosed by said frame members and positioned on said clamping portions; and a plurality of clamping members co-acting with respective fastening means to thereby clamp said mesh between said clamping portions and said clamping members with a leveraged clamping action.

Suitably, the clamping portions have a serrated profile on a face adjacent said clamping members.

Suitably, each clamping member comprises a serrated profile on a face adjacent said clamping portion.

Suitably, the security screen door further comprises a resilient member inserted between said clamping member and said clamping portion.

Suitably, each said sliding section comprises a substantially Z-shaped section, said Z-shaped section of each sliding section interlocking when said sliding sections are in the closed position.

Suitably, each said slider frame member is fastened to a midrail of said frame, each midrail comprising a clamping portion and a clamping member co-acting with respective fastening means to thereby clamp woven wire intruder resistant mesh between said clamping portion of said midrail and said clamping member with a leveraged clamping action.

Suitably, the frame of said security screen door is formed from one or more extruded frame members.

Preferably, each frame member comprises a channel section and a clamping portion spaced from said channel section.

Preferably, woven wire intruder resistant mesh covers the openings enclosed by said frame and said midrails and a plurality of clamping members co-act with respective fastening means to thereby clamp said mesh between clamping portions of said frame and clamping members with a leveraged clamping action.

Optionally, the quick action handle also locks and unlocks an outer door of said vehicle.

In another form, the invention resides in a door system for a vehicle comprising:

an outer door;

an inner, security screen door comprising a quick action lever on an inside of said security screen door;

wherein said quick action lever locks and unlocks said security screen door and said outer door.

In a further form, the invention resides in a door system for a vehicle comprising:

an outer door comprising a handle on an inside of said outer door;

an inner, security screen door comprising a quick action lever on an inside of said security screen door;

wherein said quick action lever locks and unlocks said security screen door and said handle opens said outer door.

In another form, the invention resides in a method of providing security for a vehicle, said vehicle comprising an outer door and an inner, security screen door, said method including the steps of:

opening said outer door;

unlocking a sliding section of said security screen door using a key;

moving said sliding section from a closed position to an open position to allow access from an outside to a quick action lever on an inside of said security screen door;

unlocking said security screen door by moving said quick action lever from a locked position to an unlocked position.

In a further form, the invention resides in a method of opening an outer door and an inner, security screen door of a vehicle from an inside of said vehicle, said method including the steps of:

pushing a quick action lever on an inside of said security screen door from a locked position to an unlocked position to unlock said security screen door and said outer door; and opening said outer door and said security screen door.

In a yet further form, the invention resides in a method of opening an outer door and an inner, security screen door of a vehicle from an inside of said vehicle, said method including the steps of:

sliding a sliding section of said security screen door from a closed position to an open position to allow access to a lock on an inside of said outer door;

unlocking and opening said outer door;

pushing a quick action lever on an inside of said security screen door from a locked position to an unlocked position to unlock said security screen door; and opening said security screen door.

The method may further include the step of unlocking the sliding section of said security screen door prior to sliding the sliding section to the open position.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein.

DETAILED DESCRIPTION OF THE INVENTION

The invention will be discussed in terms of an improved security screen door for a mobile home, but it will be appreciated that the improved security screen door of the present invention may be used in all types of vehicles such as caravans, mobile homes and the like without deviating from the scope of the invention.

Figure 1:
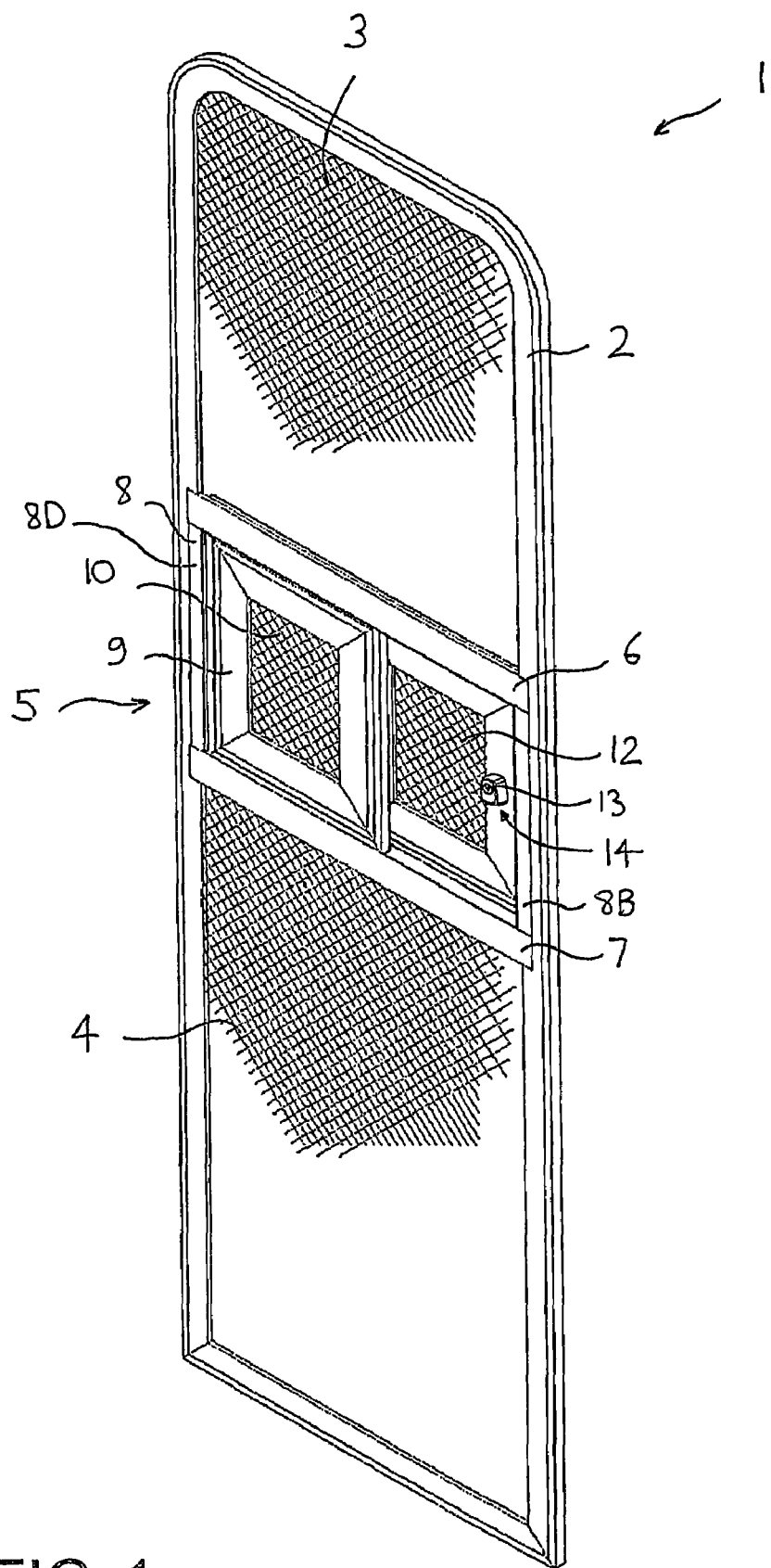
FIG. 1 shows a perspective view of the outside of an improved security screen door for a vehicle according to one form of the present invention.

FIG. 1 shows the outside of an improved security screen door 1 comprising a frame 2, top intruder resistant mesh 3, bottom intruder resistant mesh 4, an upper slider midrail 6, a lower slider midrail 7 and an openable middle section 5 comprising at least one sliding section 10, 12.

Upper slider midrail 6 extends from one side of frame 2 to the other side. Similarly, lower slider midrail 7 extends across frame 2 and is substantially parallel to upper slider midrail 6.

Top mesh 3 and bottom mesh 4 are woven grids of stainless steel wire forming an intruder resistant mesh. Suitable mesh dimensions have been described in Australian Patent No. 694515. The most suitable dimensions have been found to be wire diameters from 0.8 mm to 1.2 mm and wire spacing (in weft or warp) from 1 mm to 2.2 mm. Mesh 3 and 4 has been found to be highly effective in resisting break-in attempts by intruders.

Top mesh 3 covers the opening formed by frame 2 and upper slider midrail 6. Bottom mesh 4 covers the opening formed by frame 2 and lower slider midrail 7. The means of fastening top mesh 3 and bottom mesh 4 to the doorframe 2 and the upper slider midrail 6 and the lower slider midrail 7 respectively will be described hereinafter.

Openable middle section 5 comprises slider frame 8 and at least one sliding section 10, 12. In this embodiment, sliding sections 10, 12 are in the form of sash screens. Sliding section 10 comprises frame 9 and sliding section 12 comprises frame 11. Sliding section 12 further comprises keyhole 13 of second lock 14.

Figure 16A:
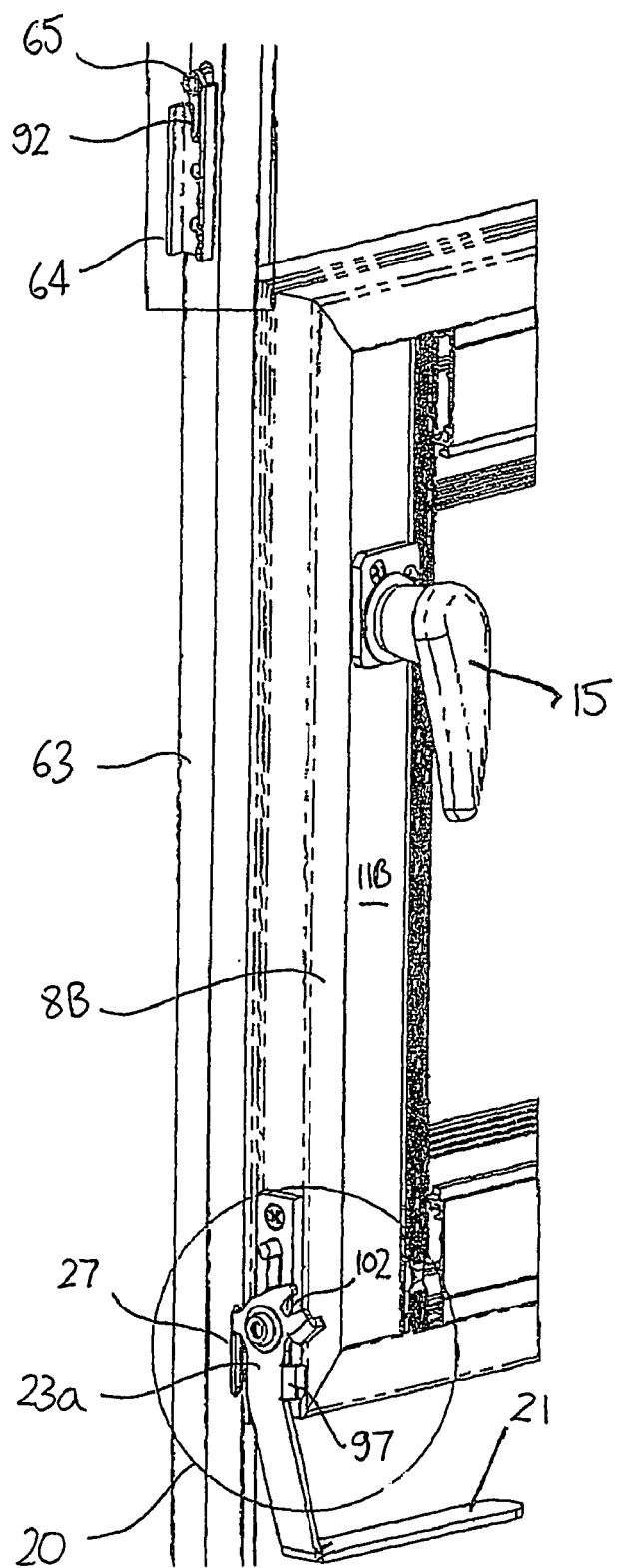
FIG. 16A shows elements of another embodiment of the first lock in an unlocked position.

In the embodiment shown in FIG. 1, both sliding sections 10, 12 are horizontally movable. In an alternative embodiment, sliding section 10 is fixed in position and sliding section 12 is horizontally movable between an open and closed position. Although sliding sections 10, 12 are shown as being substantially the same size and shape, in an alternative embodiment, sliding section 10 is about twice the width of sliding section 12 and the frames 9, 11 are thinner to allow more daylight to pass through this part of the security screen door. An example of the thinner frames are shown in FIG. 16A, such as frame member 11B.

FIG. 1 shows slider frame members 8B and 8D, which extend substantially vertically on opposite sides of openable middle section 5 from lower sliding midrail 7 to upper slider midrail 6. Slider frame members 8A and 8C (not shown) are obscured in FIG. 1 by upper slider midrail 6 and lower slider midrail 7 respectively.

Figure 2:
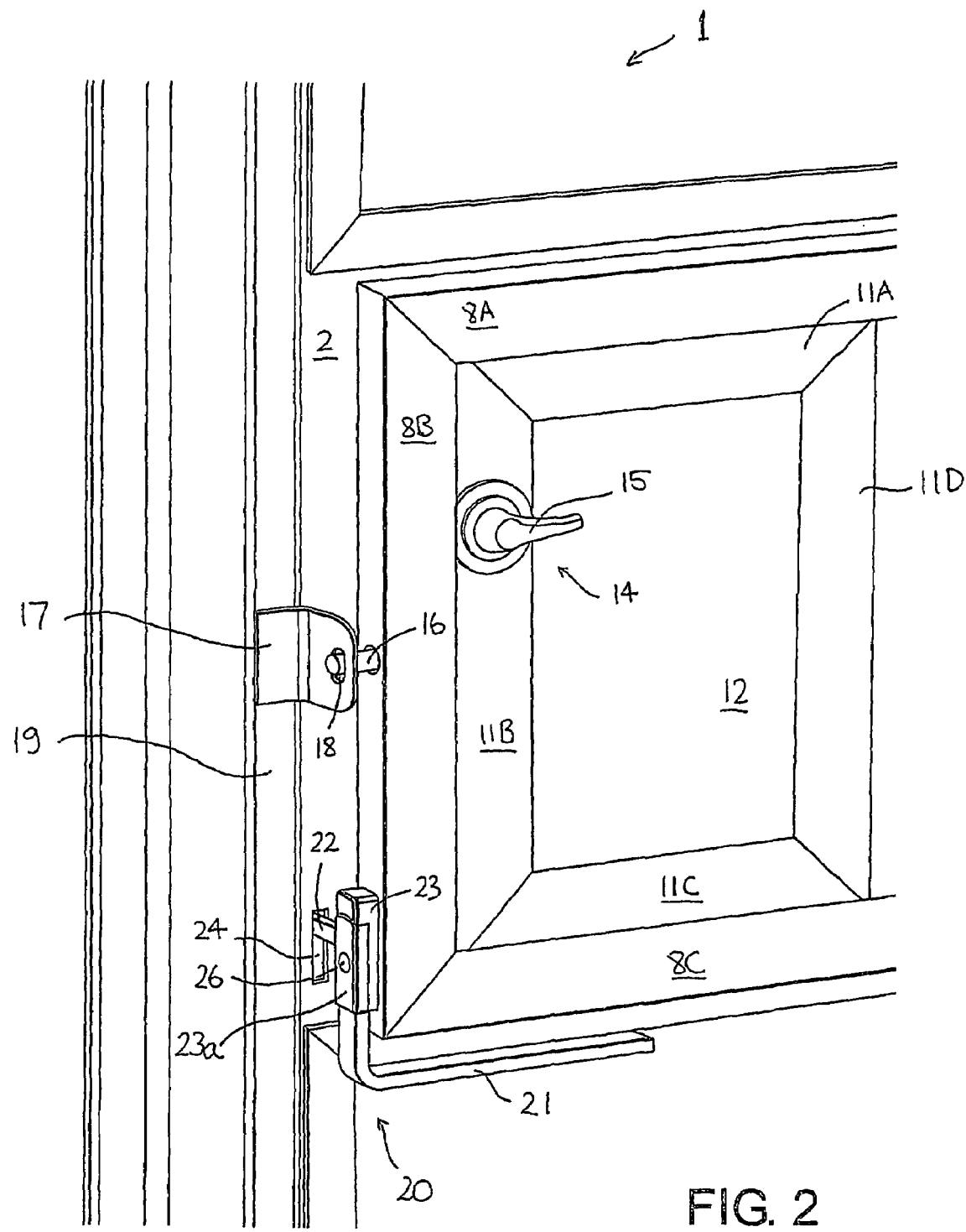
FIG. 2 shows a perspective view of the inside of part of the improved security screen door of FIG. 1.

FIG. 2 is a close-up perspective view of the inside of improved security screen door 1 showing sliding section 12, frame members 11A, 11B, 11C and 11D of frame 11, slider frame members 8A, 8B and 8C of slider frame 8 and frame 2.

Handle 15 of second lock 14 is attached to frame member 11B. Handle 15 corresponds and aligns with keyhole 13 on the outside of frame 11. Also shown in FIG. 2 is doorjamb 19 of the vehicle. L-shaped strike plate 17 is mounted on doorjamb 19 adjacent to openable middle section 5 and has aperture 18 formed therein. Spring loaded latching tongue 16 is mounted within frame member 8B and extends outwardly through an aperture in frame member 8B substantially perpendicular thereto and protrudes through aperture 18 of L-shaped strike plate 17 as shown. Sliding section 12 is biased from beneath by a biasing means in the form of a push spring (not shown) in slider frame member 8C. The push spring urges pin 16 through aperture 18 and maintains the screen door closed when the screen door is in an unlocked state.

With further reference to FIG. 2, housing 23 of first lock 20 is mounted on slider frame member 8D as shown. First lock 20 comprises a quick action lever 21, which is pivotally mounted to housing 23 by stud 26 and mounting portion 23a. Drive arm 22 extends from mounting portion 23a, passes through aperture 24 in frame 2 opposite housing 23 and terminates within first drive recess 27.

Figure 14:
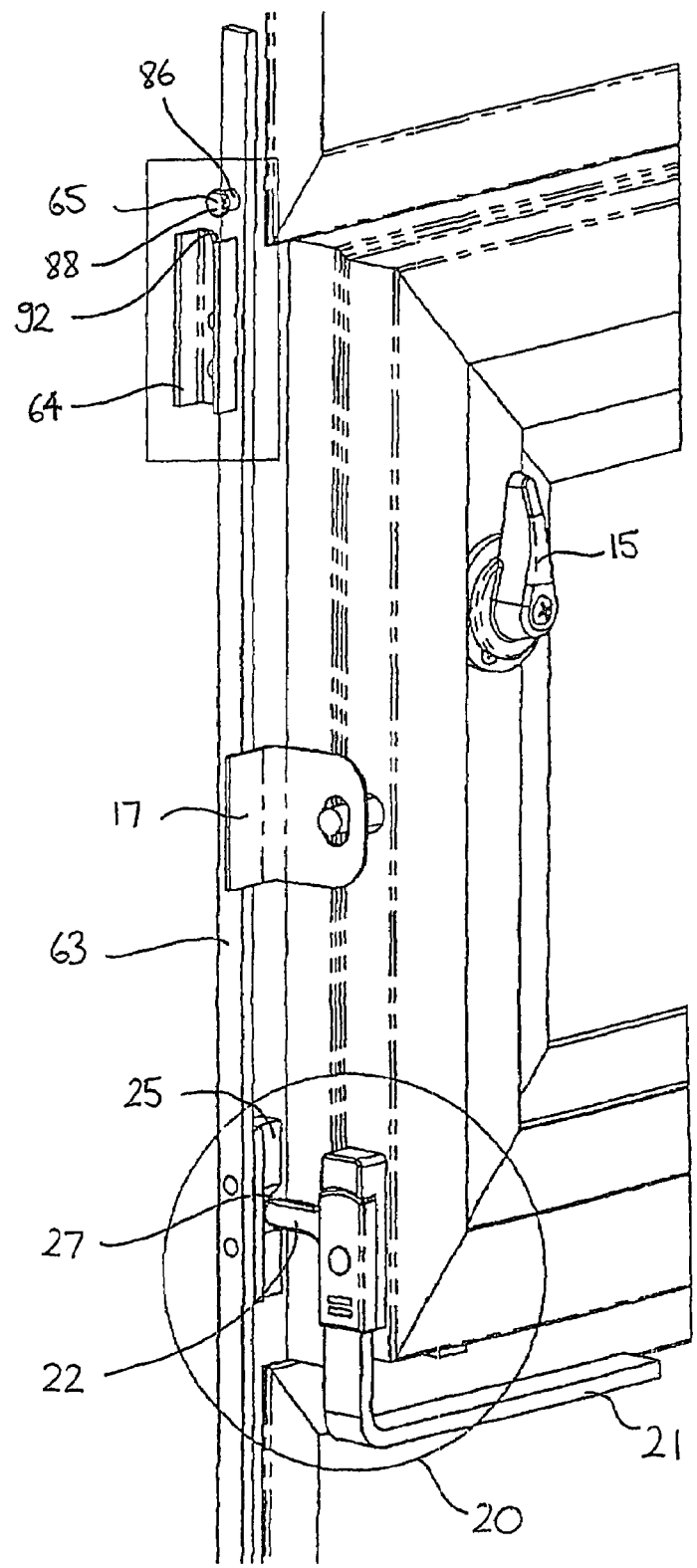
FIG. 14 shows elements of one embodiment of the first lock in an unlocked position.
Figure 14A:
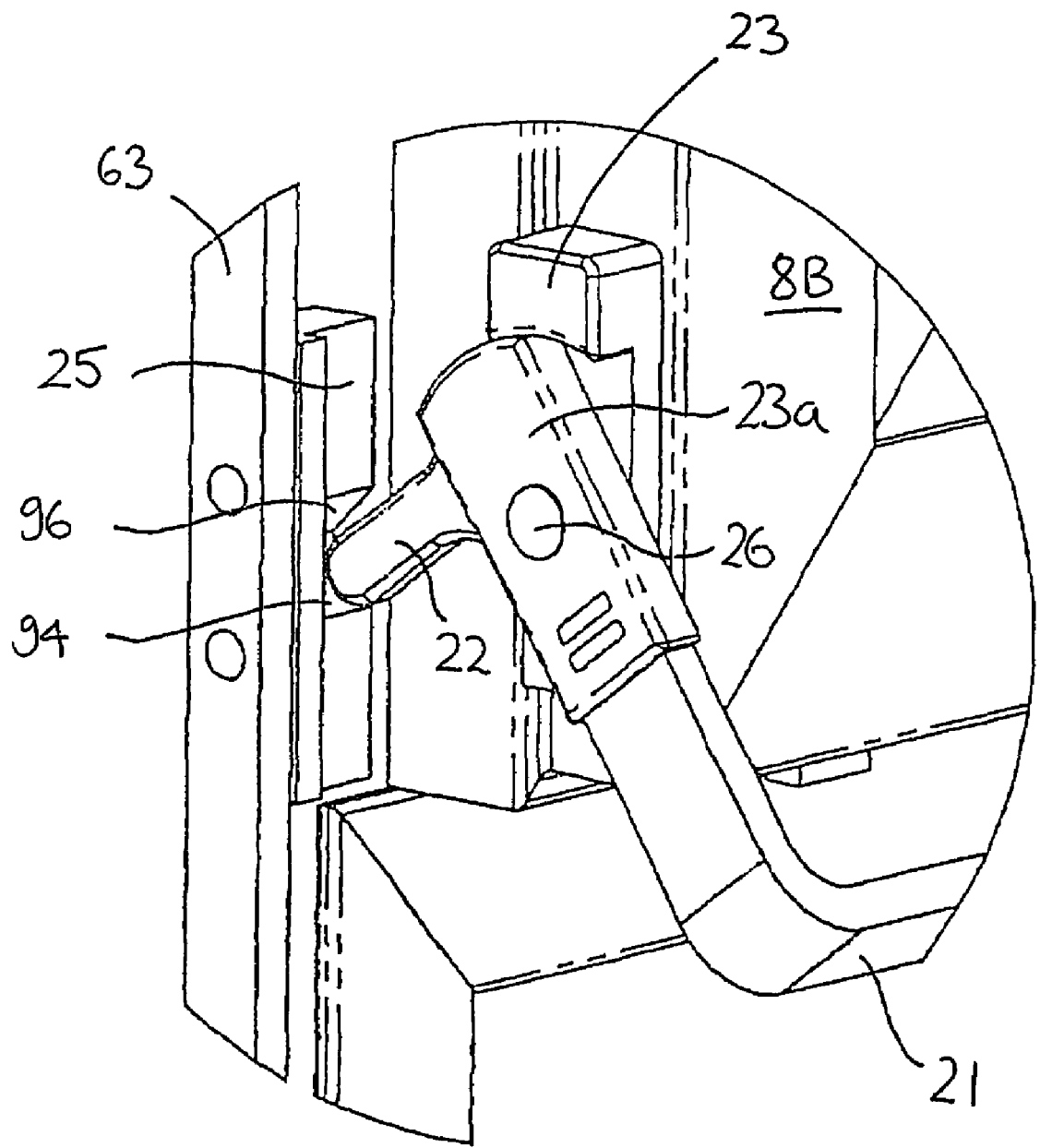
FIG. 14A shows an enlargement of the first lock in FIG. 14 in a locked position.

In one embodiment, first lock 20 is in the form of a triple lock, which is a type of lock familiar to those skilled in the art. With reference to FIGS. 14 and 14A, first drive recess 27 is formed in block 25 and block 25 is mounted on elongated primary engaging member 63. Elongated primary engaging member 63 comprises a plurality of engaging portions 65 and the triple lock comprises three such engaging portions 65. In one embodiment, engaging portions 65 are in the form of headed studs having a shank 86 and head 88, which engage with catch plates 64 mounted to the vehicle. Each catch plate 64 may be in the form of a substantially U-shaped member as shown and comprises a slotted aperture 92 for the engagement of the headed studs.

Block 25 comprises a lower angled exit shoulder 94 and an upper angled exit shoulder 96. When first lock 20 is in an open, unlocked position, as shown in FIG. 14, drive arm 22 has moved against upper angled exit shoulder 96 such that primary engaging member 63 has been moved upwards to disengage engaging portions 65 from catch plates 64. When first lock 20 is in an closed, locked position, as shown in FIG. 14A, drive arm 22 has moved against lower angled exit shoulder 94 such that primary engaging member 63 has been moved downwards to engage engaging portions 65 with catch plates 64.

Figure 16B:
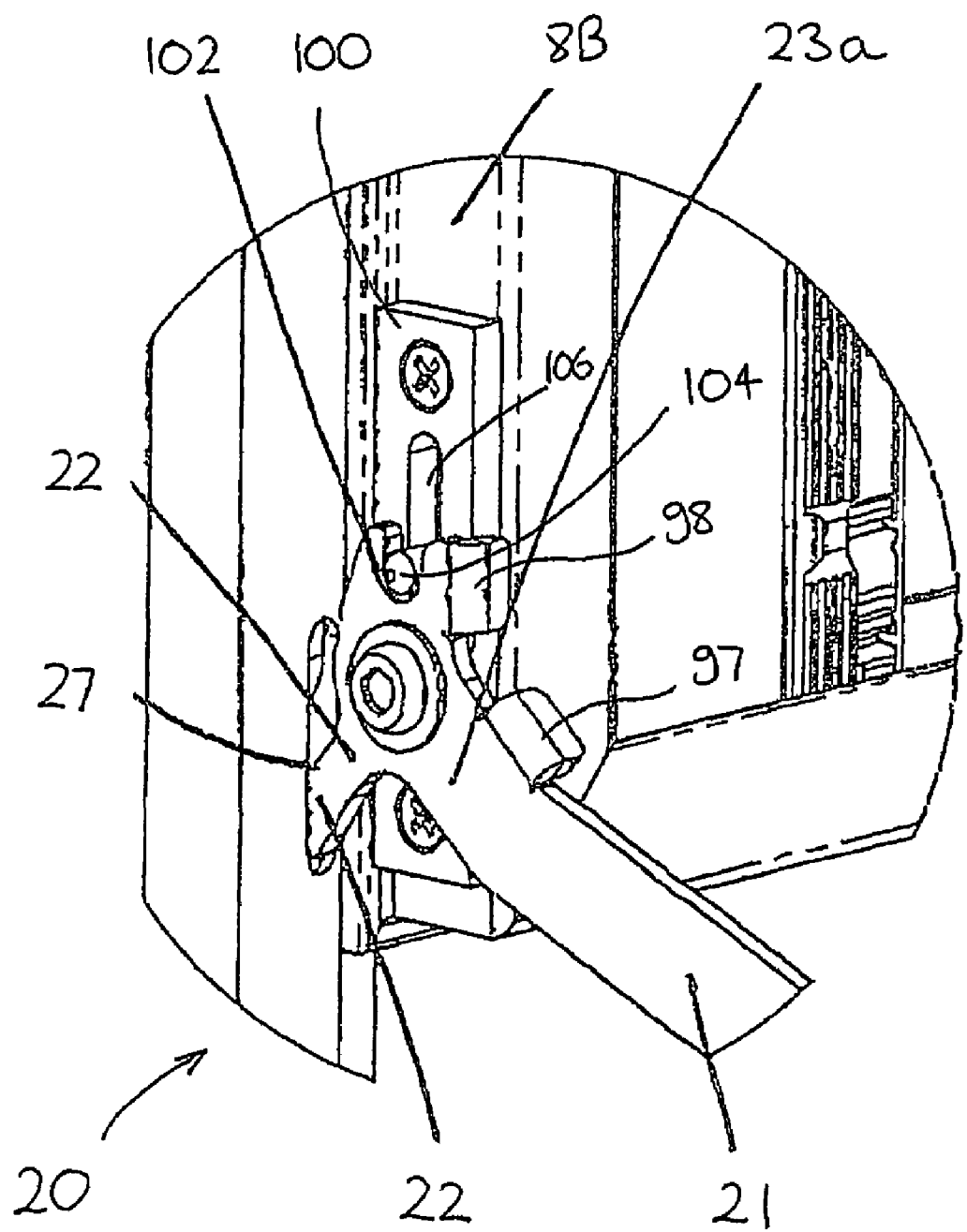
FIG. 16B shows elements of the first lock in FIG. 16A in a locked position.

FIGS. 16A and 16B show another embodiment of first lock 20, which is in the form of a triple lock. FIG. 16A shows first lock 20 in an open, unlocked position such that elongated primary engaging member is disengaged from catch plates 64. Mounting portion 23a comprises a first stop 97, which acts against frame member 8B, to prevent quick action lever 21 from being moved too far and disengaging drive arm 22 from first drive recess 27.

FIG. 16B shows first lock 20 in a closed, locked position such that elongated primary engaging member is engaged with catch plates 64. In this embodiment, mounting portion 23a also comprises a second stop 98, which acts against support plate 100, to prevent quick action lever 21 from being moved too far in the locking direction and disengaging drive arm 22 from first drive recess 27.

Figure 16C:
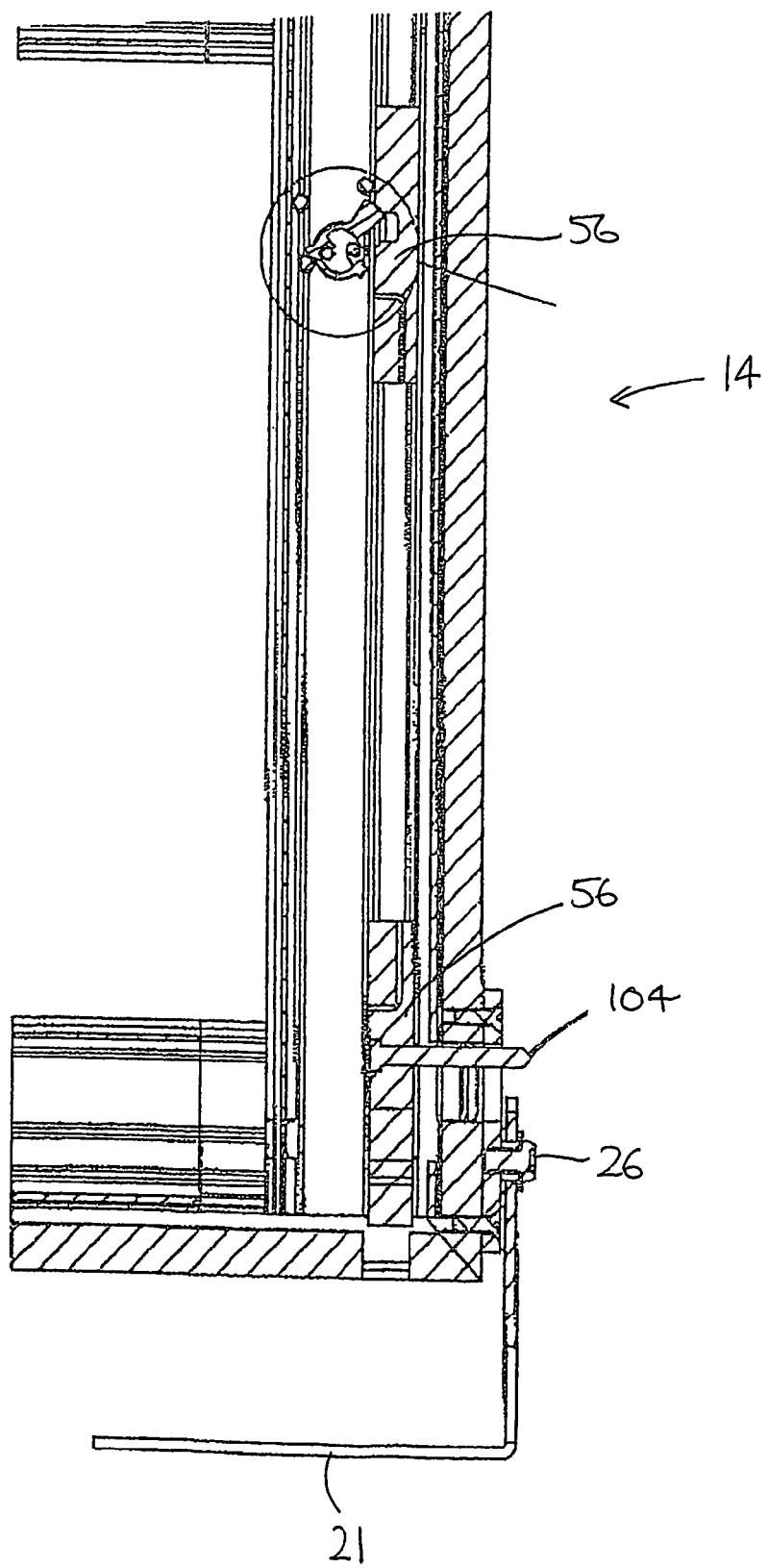
FIG. 16C is a sectional view of the first lock in FIG. 16A in an unlocked position.
Figure 16D:
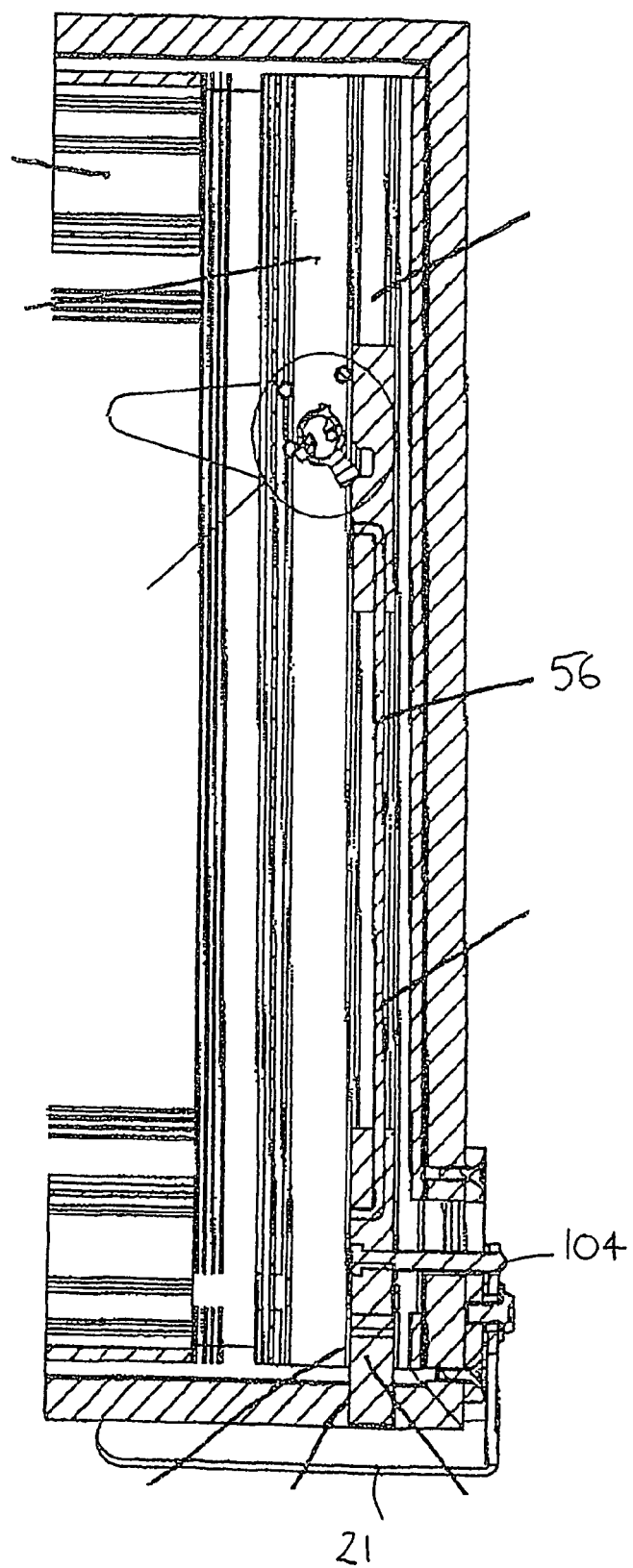
FIG. 16D is a sectional view of the first lock in FIG. 16A in a locked position.

With further reference to FIGS. 16B, 16C and 16D, mounting portion 23a of quick action lever 21 comprises slot 102 for receiving locking pin 104 of sliding section 12. Locking pin 104 is mounted to an elongated secondary engaging member 56 of the second lock 14 for sliding section 12 as shown in FIGS. 16C and 16D. When sliding section 12 is in a closed position, locking pin 104 passes through elongated aperture 106 in support plate 100. Locking second lock 14 with handle 15 moves secondary engaging member 56 and therefore locking pin 104 downward in elongated aperture 106 until pin 104 engages with slot 102 in lever 21. Hence, first lock 20 is doubled locked by virtue of pin 104 of second lock 14 engaging with slot 102.

Figure 3:
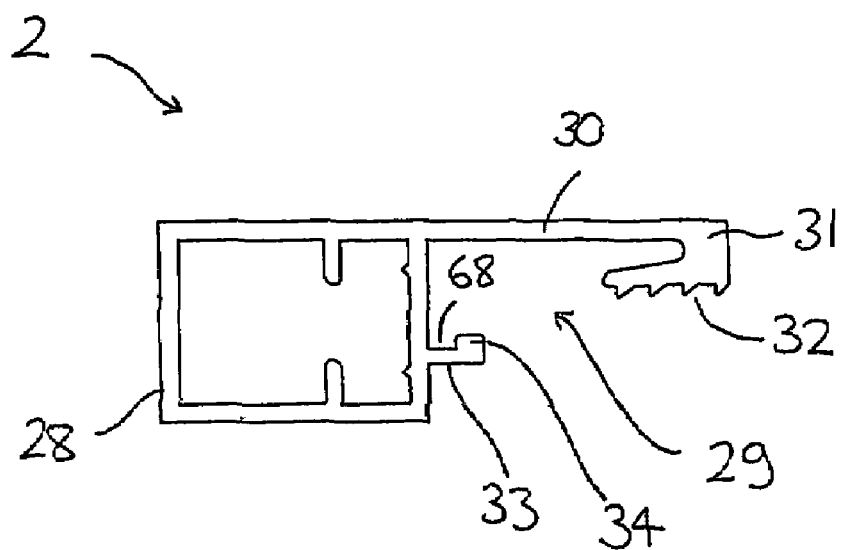
FIG. 3 shows a sectional view of a frame member of the security screen door of FIG. 1.

FIG. 3 shows a sectional view of frame 2. Frame 2 is preferably constructed by extruding appropriate lengths of aluminum or any other suitable material, such as suitable plastics material, and bent as required to form the desired shape. In the example shown, frame 2 comprises a bent portion forming the top and sides and a base portion. Frame 2 comprises a channel section 28 and an integrally formed clamping portion 29. Clamping portion 29 has a wall section 30, a flange 31, serrated profile 32, arm 33, notch 68 and lip 34. Wall section 30 extends inwardly from channel section 28 and joins flange 31. Serrated profile 32 is located upon flange 31. Arm 33 also extends inwardly from channel section 28 and terminates at lip 34 forming notch 68.

Figure 4:
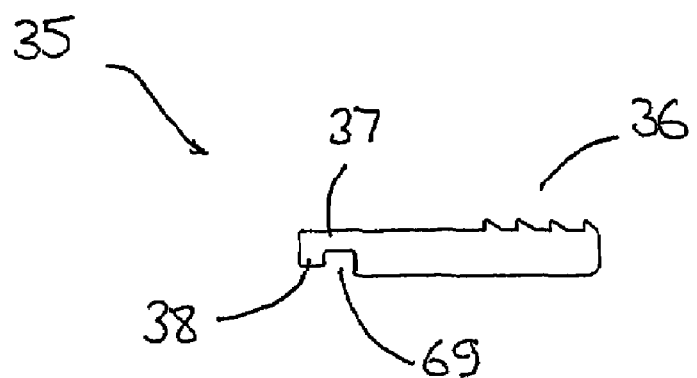
FIG. 4 shows a clamping member.

FIG. 4 shows a clamping member 35 comprising serrated profile 36 that is engagable with serrated profile 32 on clamping portion 29. An arm 37 extends from serrated profile 36 and terminates at a lip 38 forming notch 69. Lip 38 and notch 69 of clamping member 35 are engagable with notch 68 and lip 34 respectively of clamping portion 29.

Clamping portion 29 and clamping member 35 are engagable to secure top mesh 3 and bottom mesh 4 by means of a leveraged clamping action as described in Australian Patent No. 694515. Clamping member 35 and clamping portion 29 differ from the description in Australian Patent No. 694515 in that they have serrated profiles 36 and 32 respectively.

Figure 5:
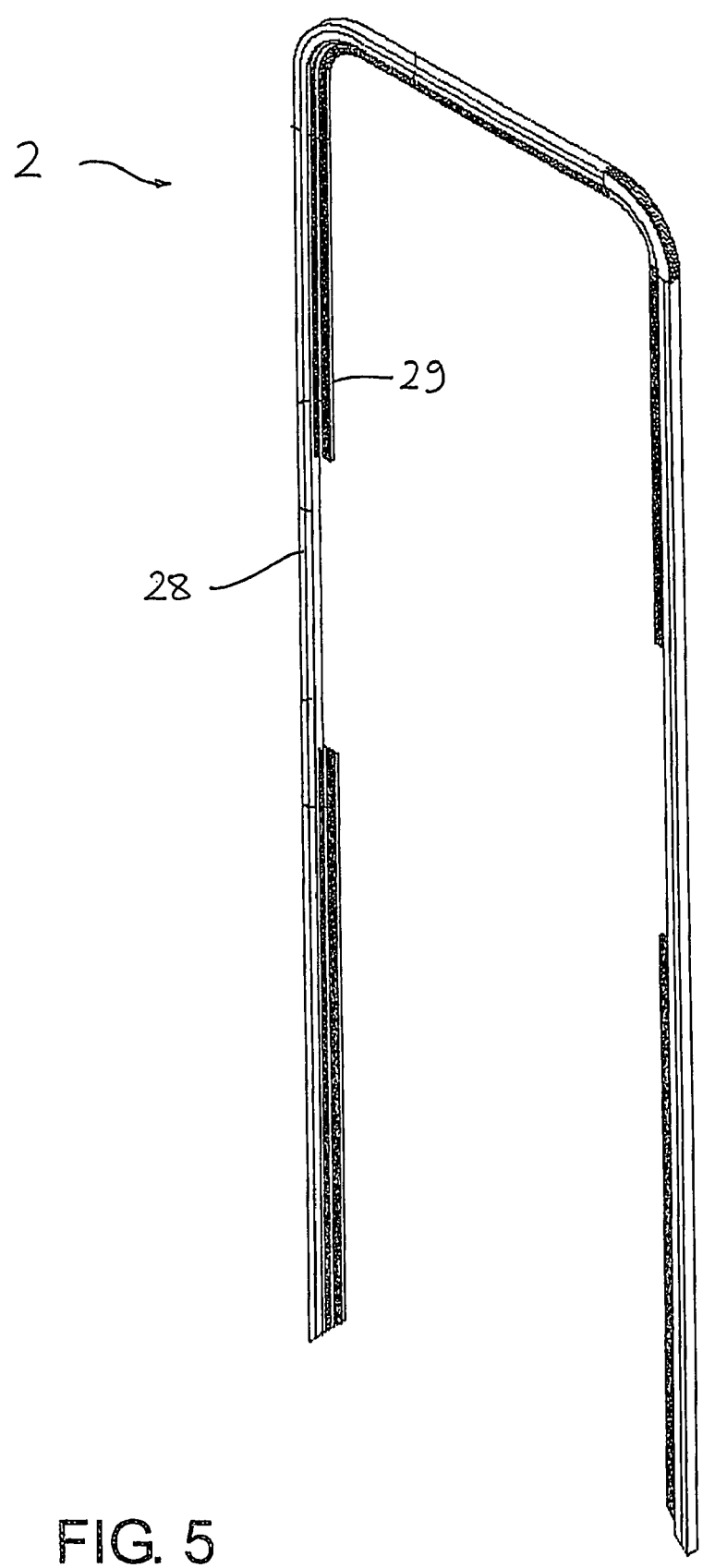
FIG. 5 shows a perspective view of the frame of the security screen door of FIG. 1.

FIG. 5 shows a perspective view of frame 2 with all other components of security screen door 1 removed for the sake of clarity. Frame 2 comprises channel section 28 and clamping portion 29 as described, except in a middle section where clamping portion 29 is omitted.

Figure 6:
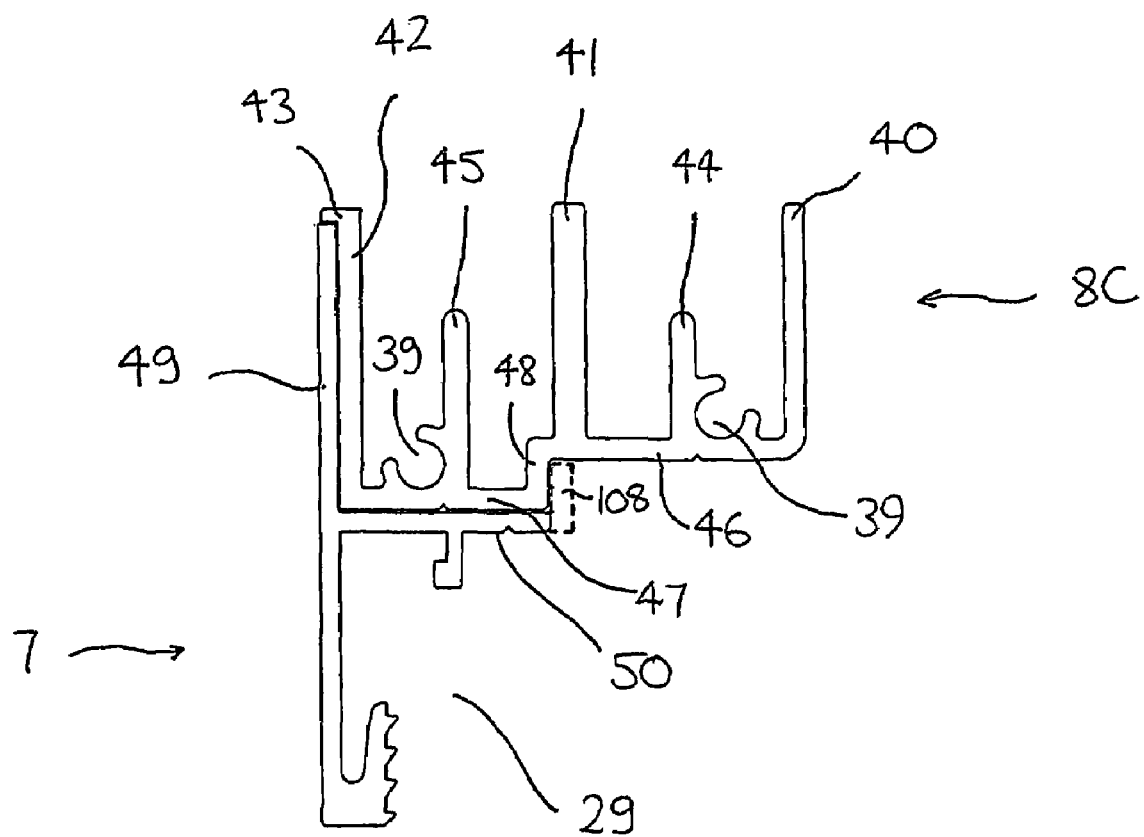
FIG. 6 shows an sectional view of a slider frame member and a lower slider midrail.

FIG. 6 shows a sectional view of slider frame member 8C located on slider midrail 7 and a person skilled in the art will realize that a similar arrangement applies to slider frame member 8A and upper slider midrail 6, i.e., FIG. 6 inverted. Lower slider midrail 7 comprises a base section 50 extending from a clamping portion 29. Clamping portion 29 on lower slider midrail 7 has the same features as that described above for frame 2. A vertical section 49 also extends from clamping portion 29.

Slider frame member 8C is shown in FIG. 6 and it will be appreciated that slider frame members 8A, 8B and 8D of slider frame 8 have the same cross sectional shape. Slider frame member 8C has an inner finger 40, a middle finger 41 and an inner flange 44 extending from an inner base section 46. A substantially circular channel 39, known in the art as a screw flute, is formed in abutment to inner flange 44 as shown.

An outer base section 47 is separated from inner base section 46 by a step 48. An outer flange 45 and an outer finger 42 extend from outer base section 47 as shown. A substantially circular channel 39 (screw flute) is formed in abutment to outer flange 45. A lip 43 is formed at the extent of outer finger 42 and wraps around vertical section 49 of lower slider midrail 7.

It should be noted that as an alternative to screw flutes 39, channels of an alternative shape may be employed to receive corner stakes for securing adjacent members together as is known in the art.

Slider frame member 8C is located upon lower slider midrail 7 as shown in FIG. 6. Rivets are used to fasten slider frame member 8C to lower slider midrail 7, although any appropriate fastening means may be used.

In another embodiment of lower slider midrail 7, base section 50 further comprises lip 108, which abuts against step 48 of slider frame member 8C to further lock together the midrail 7 and slider frame member 8C.

Figure 7:
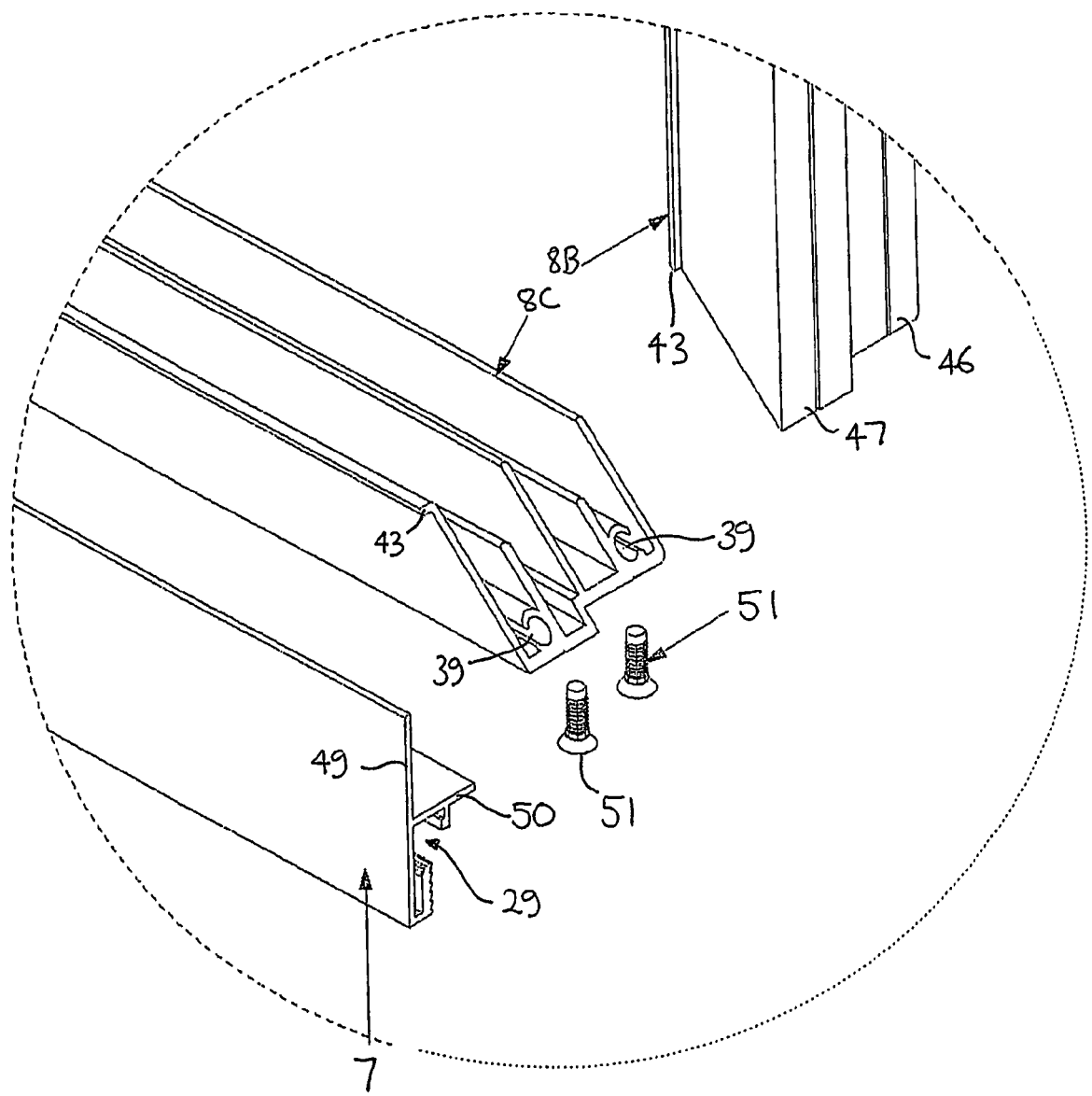
FIG. 7 is an exploded perspective view of a corner of the slider frame and the lower slider midrail.

FIG. 7 shows an exploded perspective view of a corner section of the slider frame members 8B and 8C and the lower slider midrail 7 arrangement shown in sectional view in FIG. 6. Slider frame fastening means in the form of screws 51 are used to secure slider frame member 8C to slider frame member 8B. The end sections of slider frame 8C and 8B are angled at forty-five degrees such that adjacent members abut thus forming a substantially ninety-degree corner. The screws are drilled through the base of slider frame member 8C, pass through circular channel 39 and terminate in circular channel 39 of slider frame member 8B. It should be appreciated that another appropriate fastening means may be used such as pop rivets, glue or nails. Furthermore, it is apparent that the joining of slider frame members 8B and 8C is described by way of example only and the same principles apply to the joining of all frame members on slider frame 8. Although not shown in FIG. 7, it will be appreciated that base section 50 of lower slider midrail 7 may comprises lip 108 shown in FIG. 6.

Figure 8:
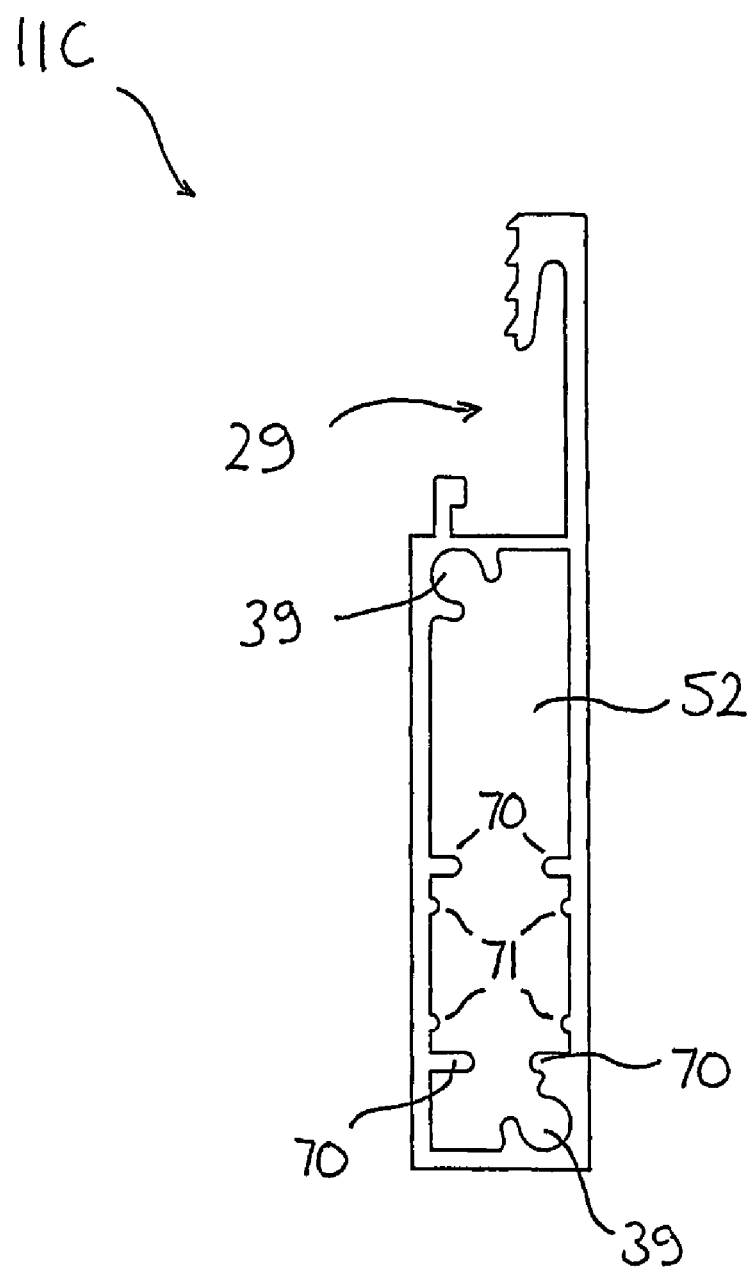
FIG. 8 shows an sectional view of a frame member of the sliding section.

FIG. 8 shows a sectional view of frame member 11C of sliding section 12. Frame member 11C comprises a substantially rectangular channel section 52 formed adjacent clamping portion 29, as previously described. Two substantially circular channels 39 (screw flutes) are formed within rectangular channel section 52 at diagonally opposite corners as shown. Member 11C further comprises location pips 70 and slider pips 71. Location pips 70 guide the movement of elongated secondary engaging member 56 (described below) therebetween and slider pips 71 reduce the friction of secondary engaging member 56 during movement. It should be appreciated that all members of frames 9 and 11 are of the same cross section as described for frame member 11C described above.

Figure 9:
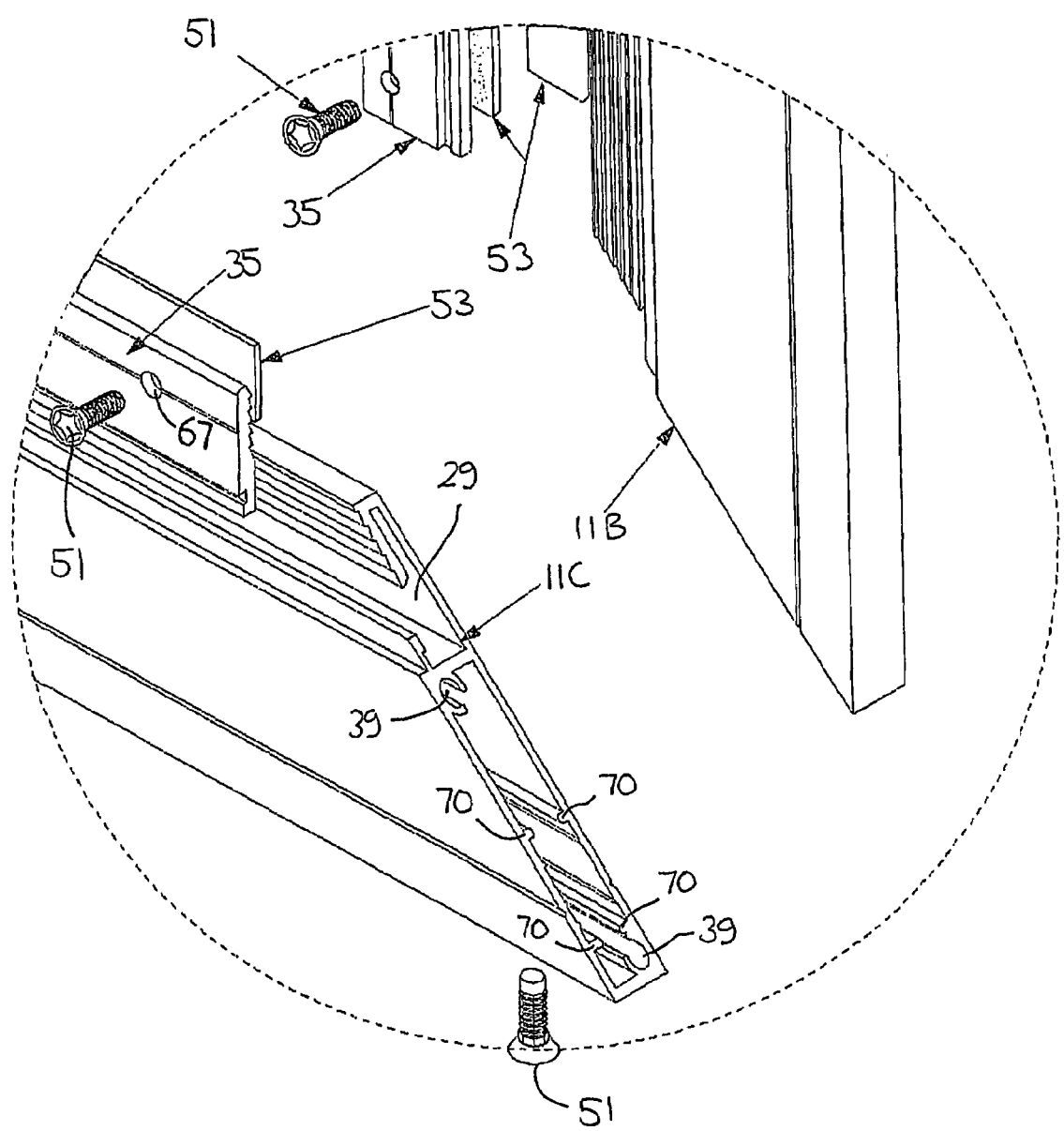
FIG. 9 is an exploded perspective view of a corner of the frame of the sliding section.

FIG. 9 shows an exploded perspective view of a corner section of frames 11C and 11B. Similar to the corner section of slider frame 8 described above, frames 11C and 11B are fastened together using fastening means in the form of screws 51 that are forced through the outer frame and into circular channels 39. As mentioned above other fastening means can be similarly used.

Clamping member 35 is also shown in FIG. 9. As shown, a resilient member in the form of a length of polymonomer tape 53 is optionally inserted between clamping member 35 and clamping portion 29 before the intruder resistant mesh is inserted between the clamping member 35 and clamping portion 29. The polymonomer tape minimizes the likelihood of corrosion occurring between the mesh and the frame. Tape 53 may be in the form of plastic tape, such as electrical insulation tape or any suitable equivalent known in the art. Screw 51 is located within aperture 67 and secures clamping member 35 to clamping portion 29. Placement of mesh between the clamping members and clamping portions will be discussed in more detail below.

Figure 10:
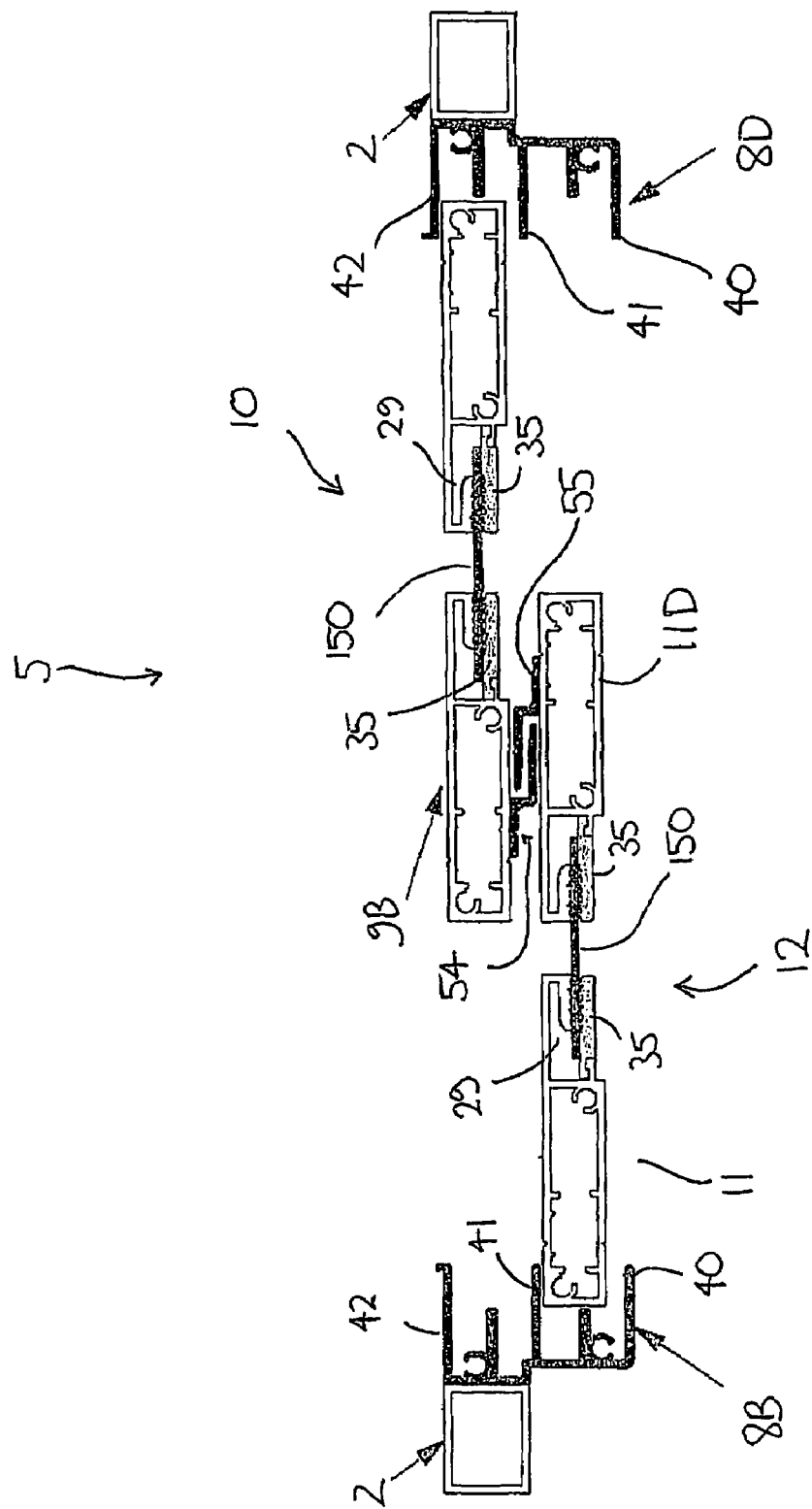
FIG. 10 shows a top sectional view of two sliding sections and the slider frame.

FIG. 10 shows a top sectional view of openable middle section 5. Frame 2 is fastened by means of rivets, or by other appropriate fastening means, to slider frame members 8B and 8D on opposite sides of security screen door 1. Fastening means such as screws or glue could also be used.

Frame 9 of sliding section 10 is located between outer finger 42 and middle finger 41 on slider frame 8 and frame 11 of sliding section 12 is located between middle finger 41 and inner finger 40 of slider frame 8. Two substantially Z-shaped sections 54 and 55 are mounted on frame member 9B and frame member 11D respectively of sliding sections 10, 12 as shown.

The intruder resistant mesh 150 is fastened to frame 9 by clamping the mesh between clamp members 35 and clamping portions 29 with the leveraged clamping action described above on all frame members of sliding section 10. It will be appreciated that mesh is fastened to frame 11 in a similar manner for sliding section 12.

Sliding section 12 is movable in a direction substantially parallel to upper midrail 6 and lower midrail 7 (each shown in FIG. 1) such that sliding section 12 passes on the inside of sliding section 10. When frame 11 abuts slider frame member 8B, the openable middle section 5 is in the closed position. When frame 11 does not abut slider frame member 8B the openable middle section 5 is in the opened position. When openable middle section is in the opened position an aperture is formed through security screen door 1 providing access from one side of the closed door to the other.

When openable middle section 5 is in the closed position, Z-shaped sections 54 and 55 interlock, as shown, and provide added strength to openable middle section 5 by binding frame 9 to frame 11. Additionally, Z-shaped sections 54 and 55 prevent an intruder levering frames 11 and 9 apart since the Z-shaped sections extend the height of the sliding section frame members.

Figure 11:
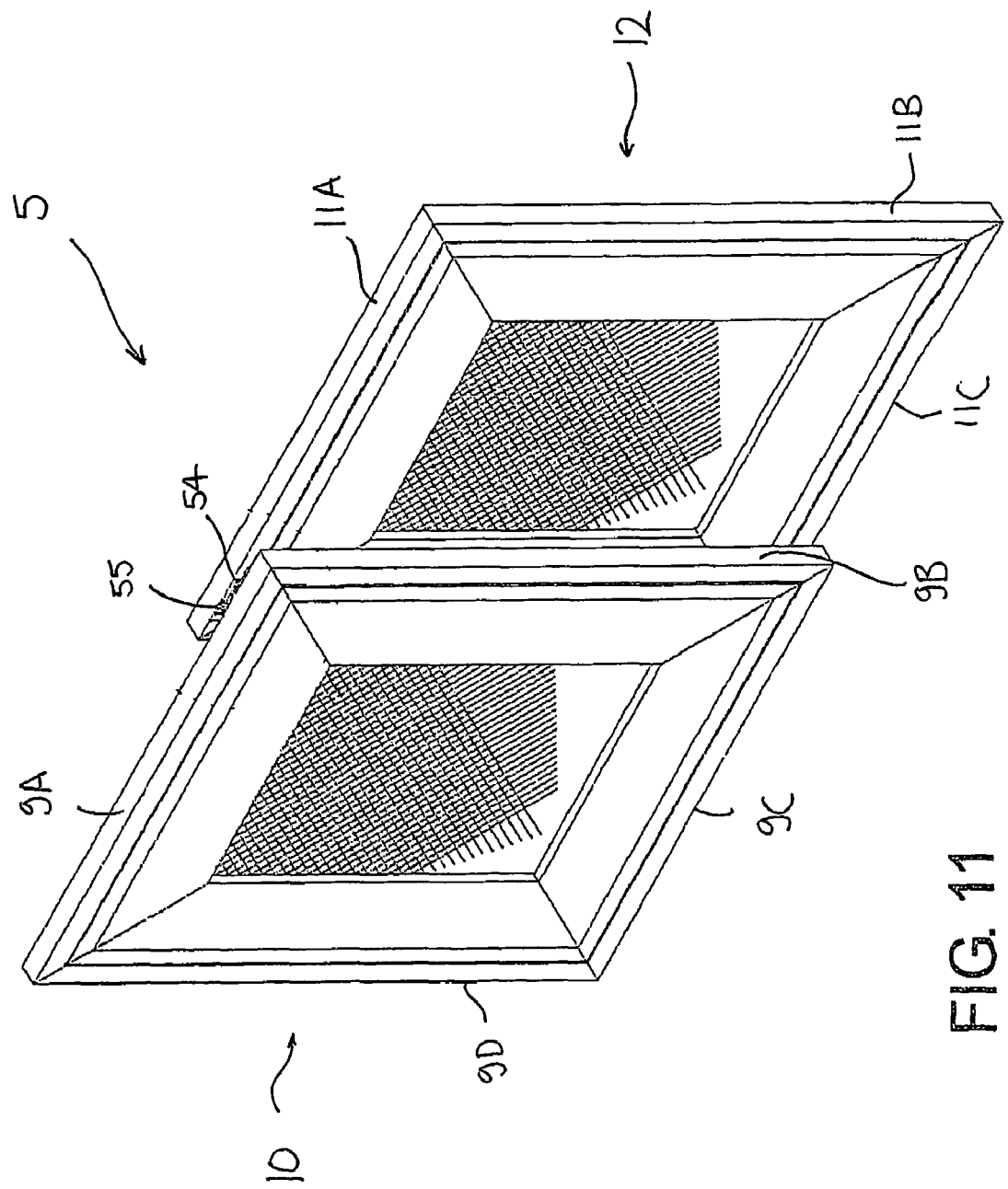
FIG. 11 shows a perspective view of two sliding sections.

FIG. 11 shows a perspective view of the assembled sliding sections 10,12. Openable middle section 5 is lockable when in the closed position. Sliding section 10 may be fixed in place to slider frame member 8C by any suitable fastening means, such as screws, leaving sliding section 12 to slide freely.

Figure 12:
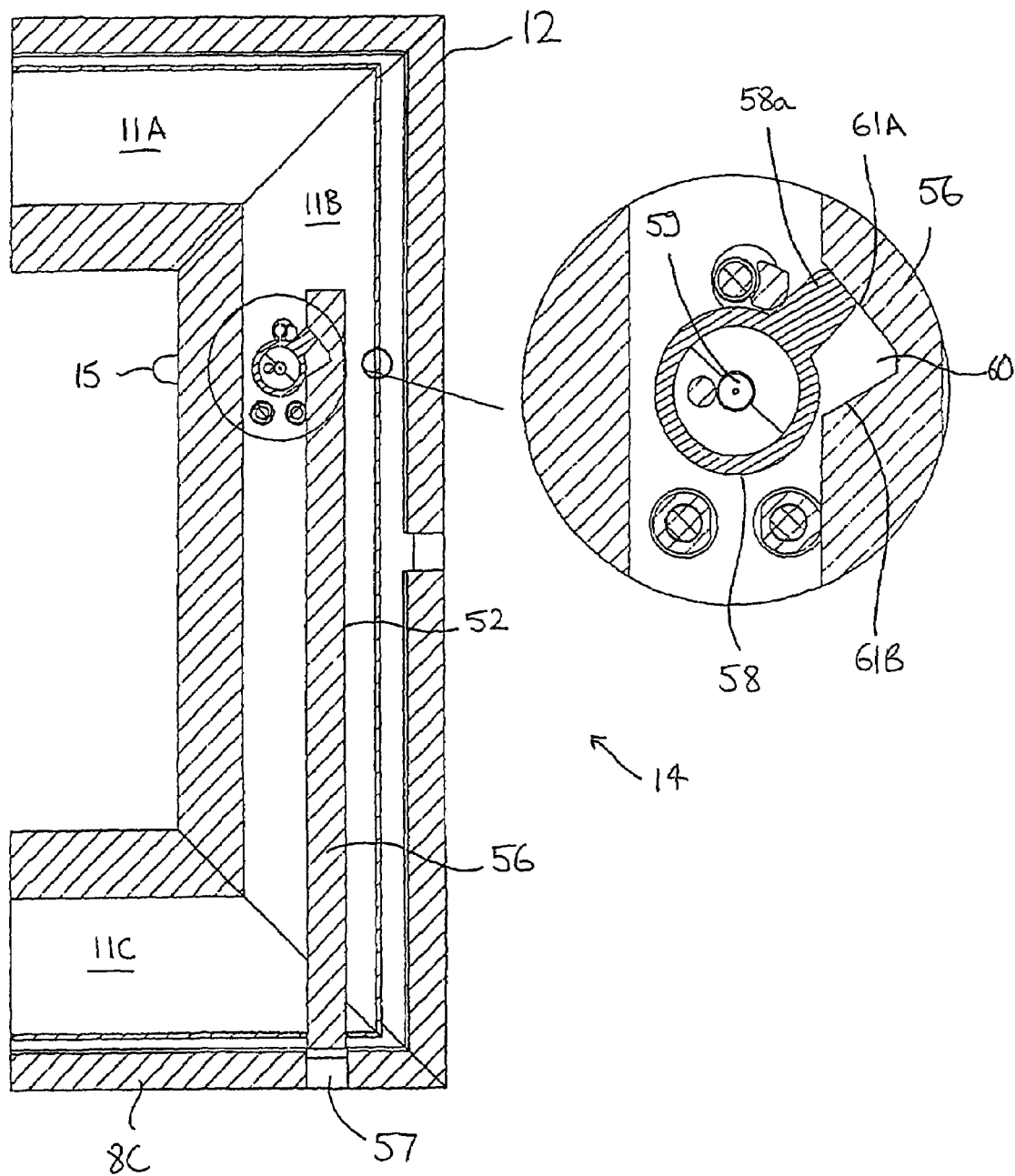
FIG. 12 shows a sectional view of a second lock for the sliding section in an unlocked position.

FIG. 12 shows a sectional view of second lock 14 when sliding section 12 is in the closed position and is not locked. Elongated secondary engaging member 56 is located within channel section 52 of frame member 11B defined by location pips 70 and is moveable in a vertical direction as discussed below. Secondary engaging member 56 has second drive recess 60 located thereon. Second drive recess 60 is formed from upper angled exit shoulder 61A and lower angled exit shoulder 61B. A cam arm 58a of cam 58 moves against either shoulder 61A or 61B of secondary drive recess 60. Slider frame member 8C has an aperture 57 located thereon and formed such that is able to receive secondary engaging member 56.

As shown in FIG. 12, when cam arm 58a contacts shoulder 61A, secondary engaging member 56 does not penetrate aperture 57. Hence, sliding section 12 can be moved freely between the opened and closed positions.

Figure 13:
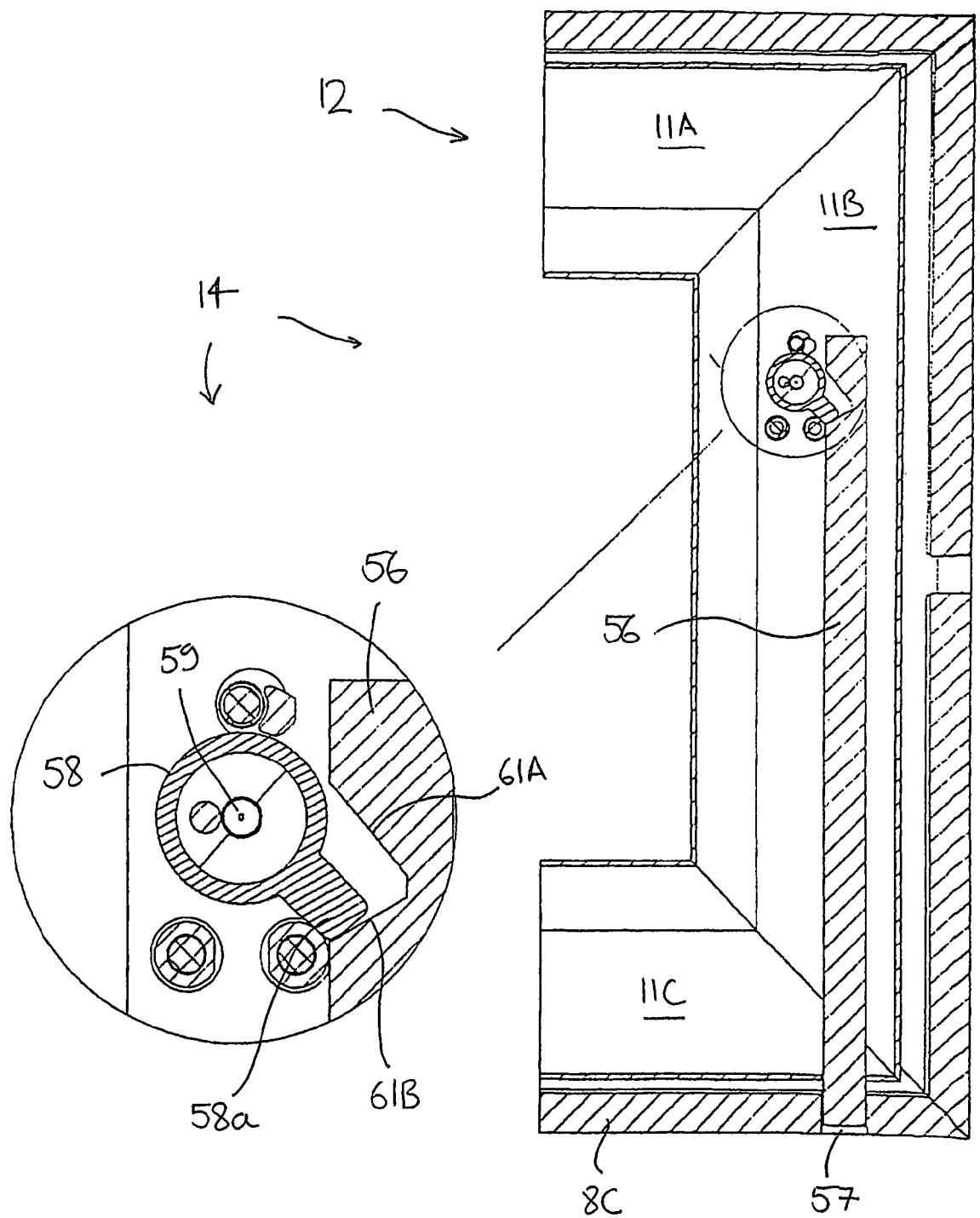
FIG. 13 shows a sectional view of the second lock of FIG. 12 in a locked position.

FIG. 13 shows a sectional view of second lock 14 in FIG. 12 when sliding section 12 is in the closed and locked position. Cam 58 and cam arm 58a are rotated around pivot 59 such that cam arm 58a moves against shoulder 61B thus driving secondary engaging member 56 down into aperture 57, thus locking sliding section 12 in the closed position.

Cam 58 and cam arm 58a are rotated around pivot 59 by turning handle 15 from the inside or by inserting a complementary key into keyhole 13 from the outside and turning the key.

FIG. 14 shows first lock 20 in the unlocked position. Frame 2 is not present in this figure to assist in understanding the operation of door lock 20. Drive arm 22 of first lock 20 resides within driving recess 27 of block 25. Elongated primary engaging member 63 is coupled to block 25 and extends vertically within channel section 28 of frame 2.

Engaging portions 65 are located at spaced intervals along primary engaging member 63. Engaging portions 65 are engaged by and disengaged from apertures 92 in catch plates 64 mounted on doorjamb 19 as described hereinbefore. In FIG. 14 engaging portions 65 are not located within catch plates 64 and therefore screen door 1 is not locked to doorjamb 19 and can be opened and closed freely. This is indicated by the downward position of quick action lever 21.

Figure 15:
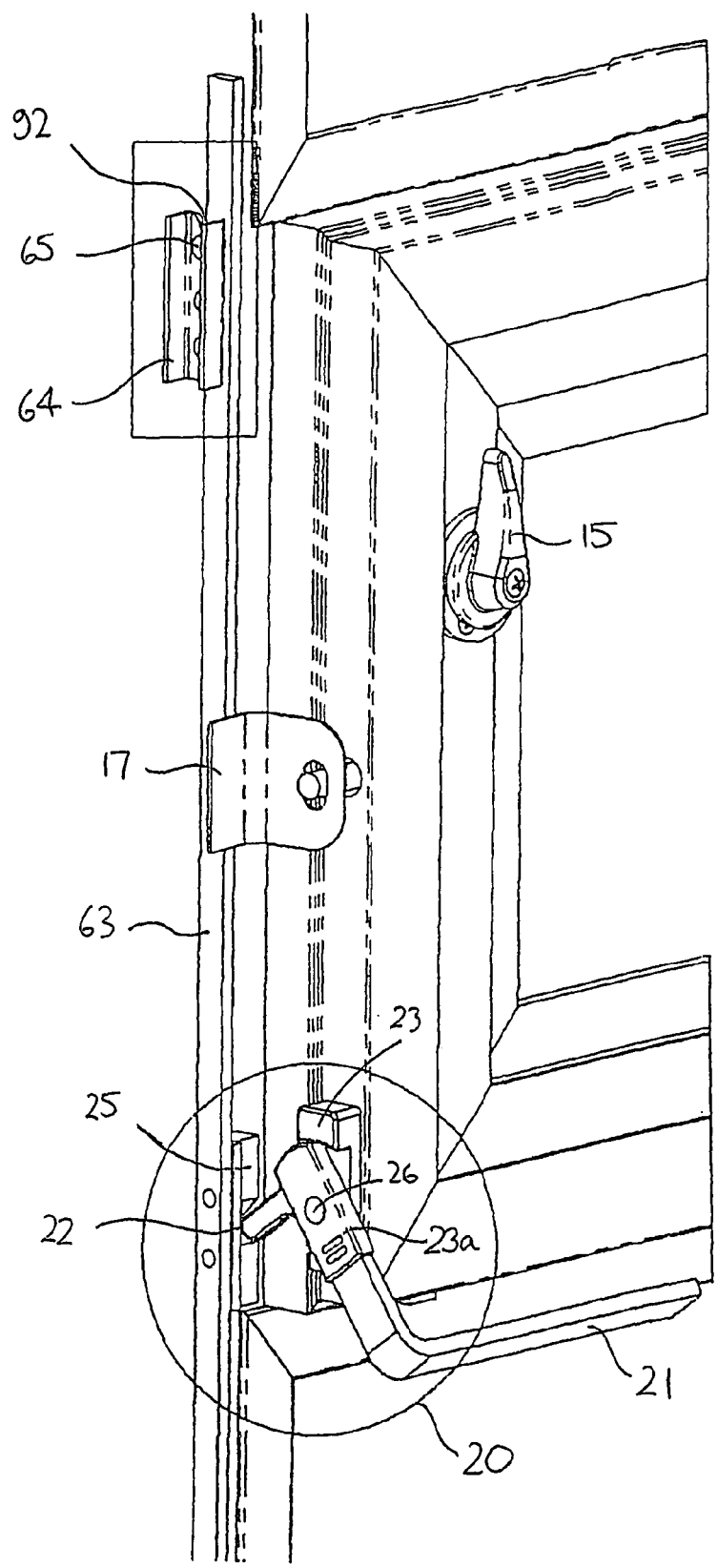
FIG. 15 shows the first lock of FIG. 14 in a locked position.

FIGS. 14A and 15 show first lock 20 in the locked position. Drive arm 22 has been pivoted around stud 26 by lifting lever 21 upwards. This operatively drives primary engaging member 63 down and secures engaging portions 65 within slotted apertures 92 of catch plates 64. This ensures that security screen door 1 cannot be opened from the outside.

When quick action lever 21 is in the locked position shown in FIGS. 14A and 15, by applying a downward force on lever 21, security screen door 1 can be unlocked. By applying an upward force on lever 21, or by pulling lever 21 upward, security screen door 1 is locked.

Figure 18:
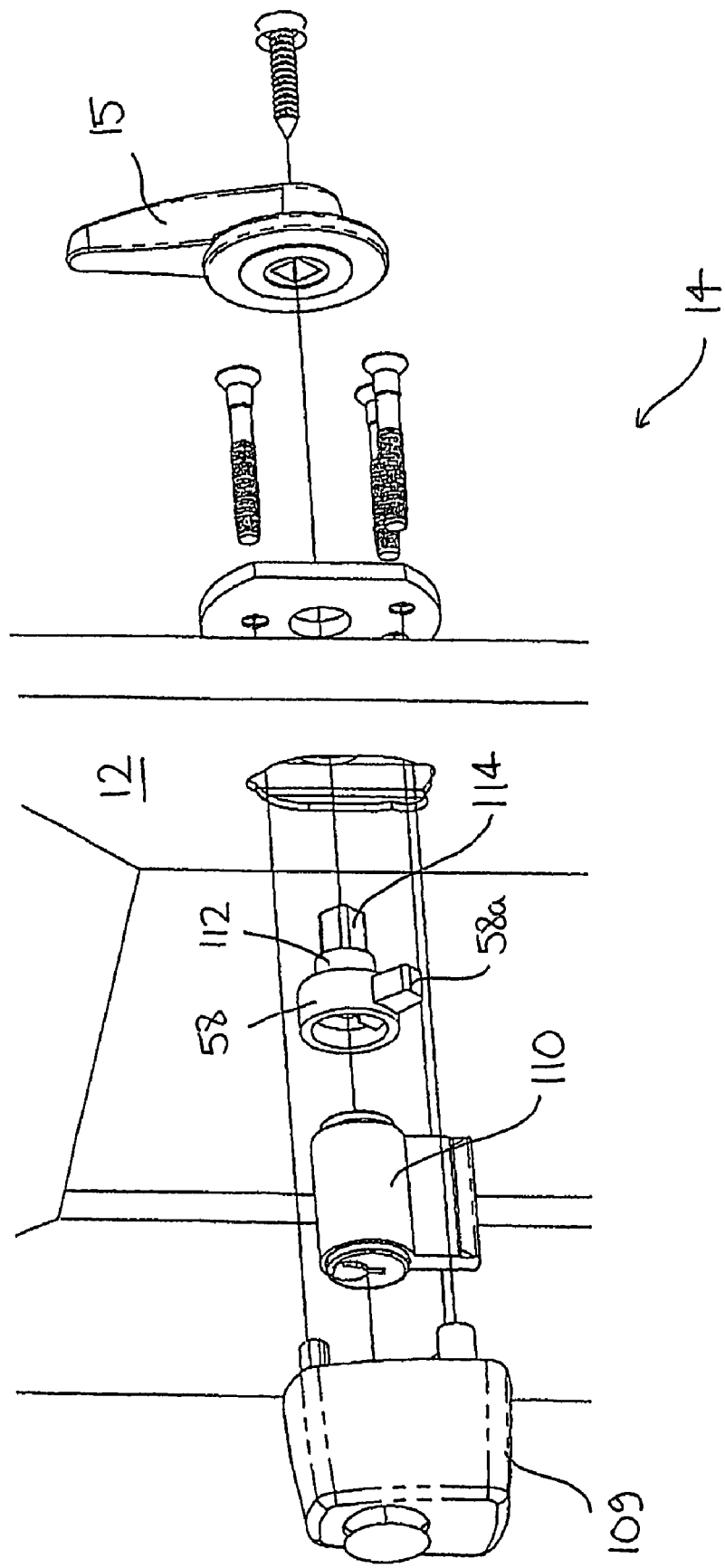
FIG. 18 shows elements of a first embodiment of the second lock.

Referring to FIG. 18, one embodiment of second lock 14 is a free rotation single cylinder lock comprising a cylinder casing 109 that houses a key operable, exterior single cylinder 110. Exterior cylinder 110 is operably connected with free movement to cam 58 having a radially protruding cam arm 58a. Cam 58 is operably connected to secondary barrel 112, the secondary barrel having a shaft portion 114 connected to handle 15 on the inside of sliding section 12 of security screen door 1.

Figure 19:
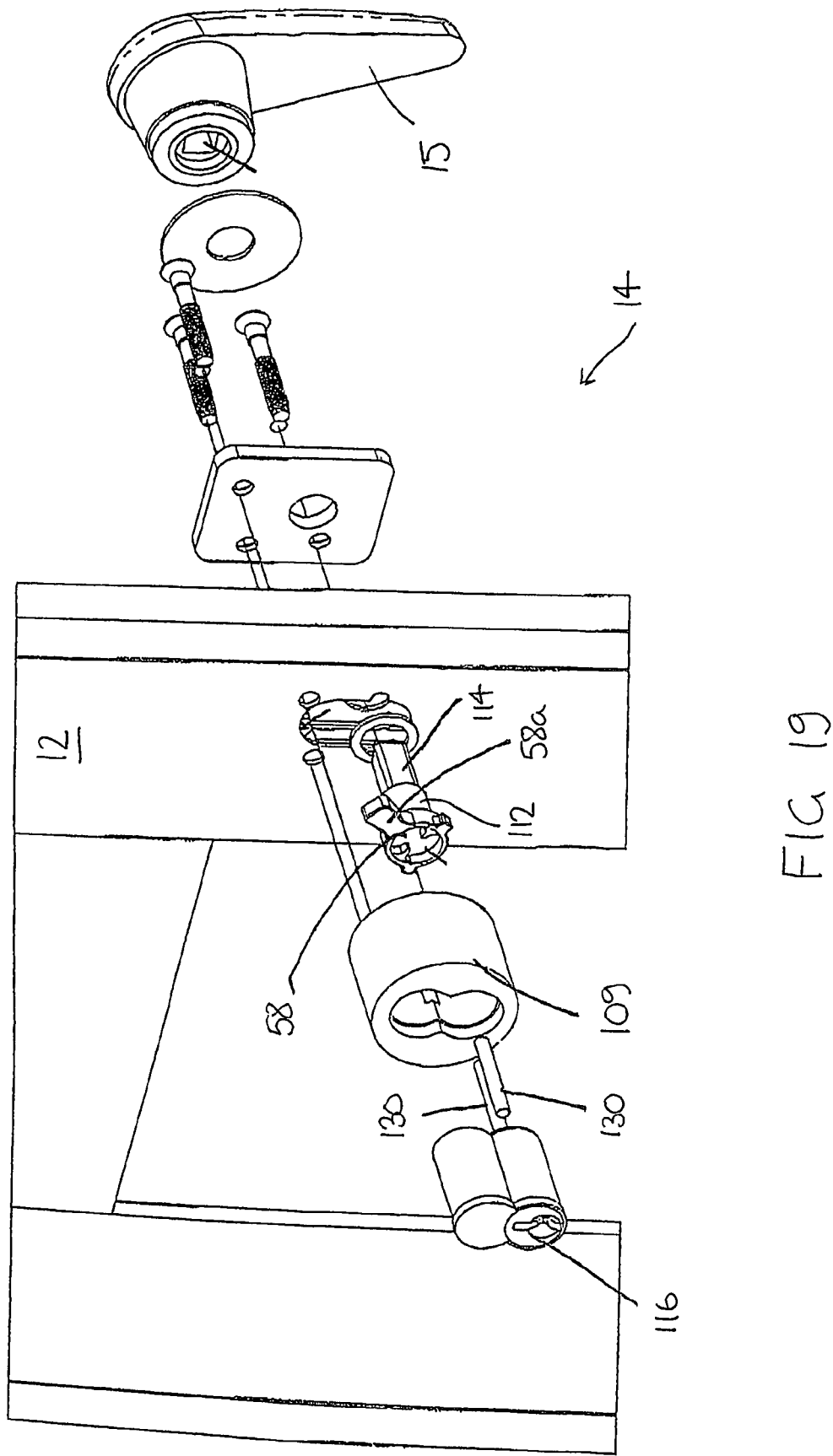
FIG. 19 shows elements of a second embodiment of the second lock.

An alternative embodiment of second lock 14 is a free rotation double cylinder lock as shown in FIG. 19. In this embodiment, second lock 14 comprises a cylinder casing 109 that houses a key operable, exterior double cylinder 116 comprising opposed barrels, each operably connected with free movement to cam 58. Drive pins 130 are received by and protrude from each barrel of double cylinder 116 for engagement by cam 58 such that the cam 58 is free to be angularly displaced while the barrels remain in their original position. These will be familiar to one skilled in the art to enable the cam to be displaced by either barrel into a locking configuration and then one of the barrels to be rotated in the reverse direction to the original position to enable removal of the key whilst maintaining the cam in the locked position.

As a further alternative, second lock 14 may be a clutched cam double cylinder lock wherein the opposed barrels are connectable without free movement to the cam 58. The cylinder includes a key-operated clutch to select which barrel is the operative barrel. In each of the above embodiments of second lock 14, handle 15 replaces key operation of the lock from the inside.

Figure 17:
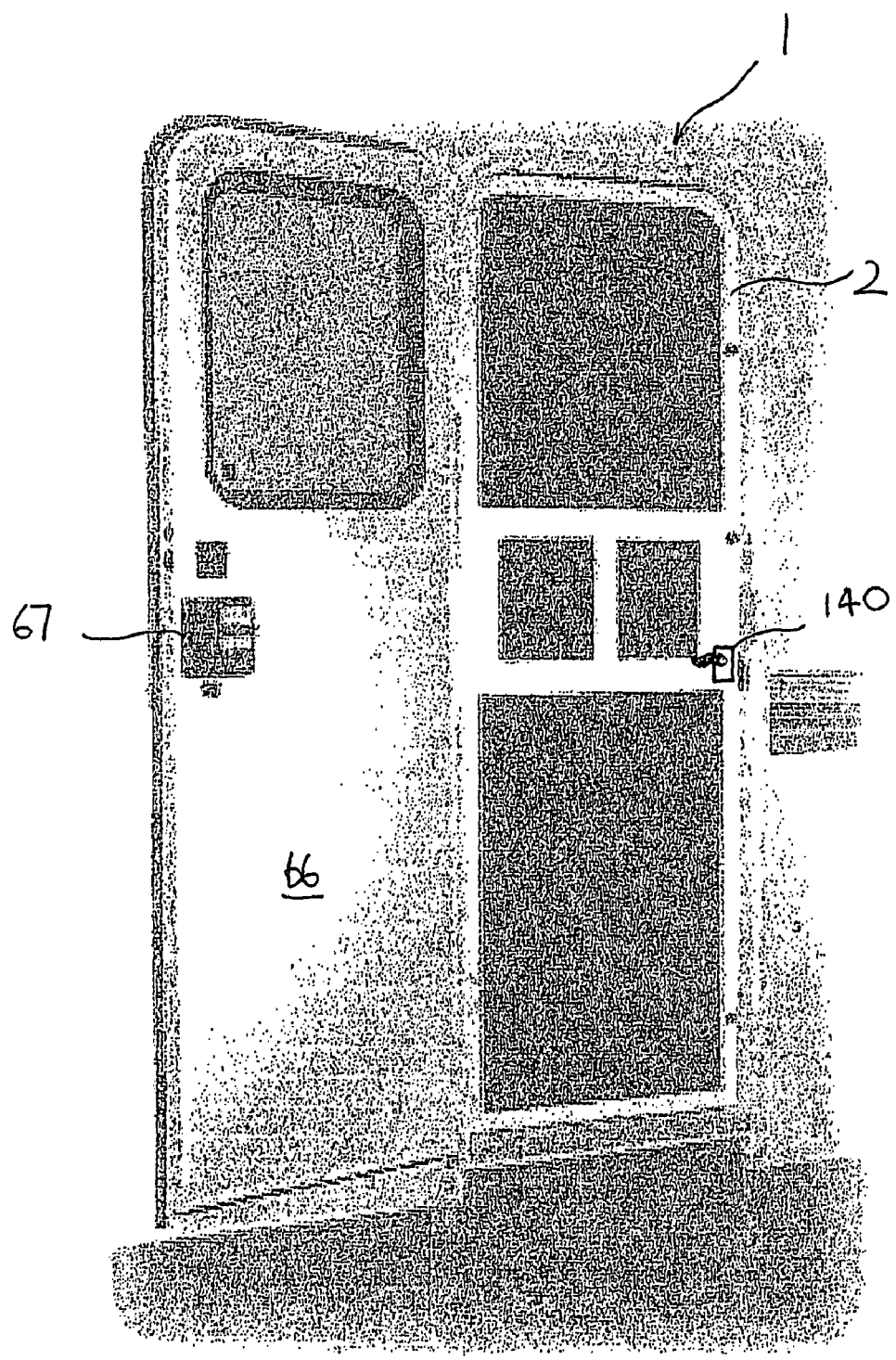
FIG. 17 shows the security screen door and outer door mounted on a vehicle.

First lock 20 and second lock 14 are used in combination to lock and unlock the security screen door 1 and thus enter and exit the vehicle to which the security screen door of the present invention is fitted, as shown in FIG. 17.

Consider the situation when security screen door 1 is closed, first lock 20 is locked, openable middle section 5 comprising sliding sections 10,12 is in the locked position via second lock 14 and a person wishes to enter the vehicle from outside. The person must unlock second lock 14 by inserting a key into keyhole 13 and turning lock 14. Sliding section 12 is then unlocked and the person is free to move section 12 to the open position. In this case section 12 is substantially behind sliding section 10 from the person's perspective and an opening is formed in the previous position of section 12. The person is then able to reach through this opening and move quick action lever 21 downwards such that first lock 20 is unlocked and security screen door 1 can be opened.

Considering the case where security screen door 1 is closed, first lock 20 is locked, sliding sections 10,12 are in the locked position via second lock 14 and the person is inside the vehicle and wants to exit therefrom. The person merely has to apply a downward force on lever 21 to release first lock 20 and unlock screen door 1. The person is then able to exit the mobile home by opening security screen door 1 without needing a key. Hence, quick action lever 21 facilitates quick release of first lock 20 and egress from the vehicle.

If the outer door 66, shown in FIG. 17, is closed and locked as well as screen door 1, the person must first unlock sliding section 12 via handle 15 to unlock second lock 14. Sliding section 12 is then slid to an open position. The person then reaches through the opening formed in openable middle section 5 and unlocks outer door lock 67, as shown in FIG. 17. Security screen door 1 is then unlocked and opened as described above.

Alternatively, when the outer door 66 is also closed, pushing the quick action lever 21 may also cause the outer door lock 67 to be unlocked in addition to unlocking the security screen door 1. This may be achieved by a latch 140 mounted on the outside of the security screen door 1. When lever 21 is moved from the locked to the unlocked position, the latch 140 on the outside of the security screen door moves to unlock the outer door lock 67, thus obviating the need to open sliding section 12 of security screen door 1 to unlock and open outer door 66.

The improved security screen door of the present invention thus addresses at least some of the problems of the prior art. The security screen door provides a significantly increased level of security over prior art devices due to the intruder resistant mesh and clamping member arrangements, which have a higher resistance to penetration. Australian Patent No. 694515 has been improved upon due to the clamping member and portions having a serrated contact with the mesh and the insertion of the polymonomer tape at the contact.

The simple keyless exit procedure reduces the chance of occupants being trapped within the vehicle in the event of fire or other emergency even if the occupants are hysterical and/or frightened. This feature is especially significant to the mobile home and campervan industry where a large proportion of elderly people utilize these vehicles for taking traveling holidays.

Throughout this specification the aim has been to describe the preferred embodiments of the invention without limiting the invention to any one embodiment or specific collection of features. Other embodiments of the present invention are envisaged that do not depart from the scope of the invention as described herein. For example, the Applicant envisages that variations to the locks described may be made, such as additionally or alternatively moving secondary engagement member 56 into and out of an aperture in upper slider frame member. Second lock 14 may comprise two cams 58, which simultaneously drive two secondary engagement members 56 into and out of a first and second aperture in upper and lower slider frames for greater security.

The invention claimed is:

1. A security screen door for vehicles, said screen door comprising:
   a frame forming an opening;
   at least one sliding section within said frame;
   a quick action lever on an inside of said security screen door for locking and unlocking said security screen door via a first lock; and
   said sliding section comprising a second lock for securing said sliding section in a closed position;
   wherein said second lock is unlocked from an outside using a key to allow said sliding section to be moved from a closed position to an open position to allow access from the outside to said quick action lever.

2. The security screen door of claim 1, wherein said first lock comprises a triple lock.

3. The security screen door of claim 1, wherein said second lock is one of the following: a free rotation single cylinder lock, a free rotation double cylinder lock, a clutched cam cylinder lock.

4. The security screen door of claim 1, wherein said quick action lever is pivotally mounted to a frame member of said door, said quick action lever comprising a drive arm for locking and unlocking said first lock.

5. The security screen door of claim 4, wherein said first lock comprises a first drive recess coupled to an elongated primary engaging member, said drive arm moving against lower and upper angled exit shoulders of said drive recess to respectively engage said primary member with, and disengage said primary member from, catch plates mounted on said vehicle.

6. The security screen door of claim 1, wherein said quick action lever further comprises at least one stop to limit movement of said lever.

7. The security screen door of claim 1, wherein said sliding section comprises a locking pin, said locking pin engaging a slot in said quick action lever when said quick action lever is in a locked position.

8. The security screen door of claim 7, wherein said second lock comprises an elongated secondary engaging member which engages with an aperture in a frame member of said door to lock said sliding section.

9. The security screen door of claim 1, further comprising woven wire intruder resistant mesh covering at least part of said opening formed by said frame.

10. The security screen door of claim 1, wherein each said sliding section is a sash screen.

11. The security screen door of claim 10, wherein at least one of said sash screens is slidable within a pair of slider frame members.

12. The security screen door of claim 10, wherein each said sliding section comprises:
    a plurality of frame members, each frame member having a channel section and a clamping portion spaced from said channel section;
    woven wire intruder resistant mesh covering an opening enclosed by said frame members and positioned on said clamping portions; and
    a plurality of clamping members co-acting with respective fastening means to thereby clamp said mesh between said clamping portions and said clamping members with a leveraged clamping action.

13. The security screen door of claim 12, wherein said clamping portions have a serrated profile on a face adjacent said clamping members.

14. The security screen door of claim 12, wherein each clamping member comprises a serrated profile on a face adjacent said clamping portion.

15. The security screen door of claim 12, further comprising a resilient member inserted between said clamping member and said clamping portion.

16. The security screen door of claim 1, wherein each said sliding section comprises a substantially Z-shaped section, said substantially Z-shaped section of each sliding section interlocking when said sliding sections are in the closed position.

17. The security screen door of claim 11, wherein each said slider frame member is fastened to a midrail of said frame, each said midrail comprising:
    a clamping portion;
    a clamping member co-acting with respective fastening means to thereby clamp woven wire intruder resistant mesh between said clamping portion of said midrail and said clamping member with a leveraged clamping action.

18. The security screen door of claim 1, wherein said frame of said security screen door is formed from one or more extruded frame members.

19. The security screen door of claim 18, wherein each frame member of said security screen door comprises a channel section and a clamping portion spaced from said channel section.

20. The security screen door of claim 17, wherein woven wire intruder resistant mesh covers the openings enclosed by said frame and said midrails and a plurality of clamping members co-act with respective fastening means to thereby clamp said mesh between clamping portions of said frame and clamping members with a leveraged clamping action.

21. The security screen door of claim 1, wherein said quick action handle also locks and unlocks an outer door of said vehicle.

22. A door system for a vehicle comprising:
an outer door comprising a handle on an inside of said outer door;
an inner, security screen door comprising a quick action lever on an inside of said security screen door and a lockable sliding section that provides access to said outer door;
wherein said quick action lever locks and unlocks said security screen door and said handle opens said outer door.

23. A method of providing security for a vehicle, said vehicle comprising an outer door and an inner, security screen door, said method including the steps of:
opening said outer door;
unlocking a lockable sliding section of said security screen door using a key;
moving said sliding section from a closed position to an open position to allow access from an outside to a quick action lever on an inside of said security screen door;
unlocking said security screen door by moving said quick action lever from a locked position to an unlocked position.

24. A method of opening an outer door and an inner, security screen door of a vehicle from an inside of said vehicle, said method including the steps of:
sliding a lockable sliding section of said security screen door from a closed position to an open position to allow access to a lock on an inside of said outer door;
unlocking and opening said outer door;
pushing a quick action lever on an inside of said security screen door from a locked position to an unlocked position to unlock said security screen door; and
opening said security screen door.

25. The method of claim 24, further including the step of unlocking said sliding section of said security screen door prior to sliding said sliding section to the open position.

* * * * *

UNITED STATES PATENT AND TRADEMARK OFFICE
CERTIFICATE OF CORRECTION

PATENT NO.          : 7,448,668 B2                                          Page 1 of 1
APPLICATION NO. : 10/540175
DATED                  : November 11, 2008
INVENTOR(S)        : Steven John Brabeck et al.

It is certified that error appears in the above-identified patent and that said Letters Patent is hereby corrected as shown below:

On the Title Page, Item (73)
The Assignee listed on front page of the patent should read: IPH International Pty Ltd., Ormeau, Queensland (AU)

Signed and Sealed this

Sixth Day of January, 2009

JON W. DUDAS
*Director of the United States Patent and Trademark Office*